United States Patent
Harada et al.

(10) Patent No.: US 9,233,705 B2
(45) Date of Patent: Jan. 12, 2016

(54) STEERING COLUMN SUPPORT APPARATUS

(75) Inventors: Kazuyuki Harada, Gunma (JP);
Katsuhiko Sawa, Gunma (JP);
Takahiro Tanaka, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/347,065

(22) PCT Filed: Aug. 9, 2012

(86) PCT No.: PCT/JP2012/070382
§ 371 (c)(1),
(2), (4) Date: May 13, 2014

(87) PCT Pub. No.: WO2013/058006
PCT Pub. Date: Apr. 25, 2013

(65) Prior Publication Data
US 2014/0246266 A1 Sep. 4, 2014

(30) Foreign Application Priority Data

Oct. 18, 2011 (JP) .................................. 2011-228500
Nov. 24, 2011 (JP) .................................. 2011-255748
Nov. 30, 2011 (JP) .................................. 2011-261134

(51) Int. Cl.
*B62D 1/187* (2006.01)
*B62D 5/04* (2006.01)
*B62D 1/189* (2006.01)

(52) U.S. Cl.
CPC ................ *B62D 1/187* (2013.01); *B62D 1/189* (2013.01); *B62D 5/0403* (2013.01); *B62D 5/04* (2013.01)

(58) Field of Classification Search
CPC combination set(s) only.
See application file for complete search history.

(56) References Cited

U.S. PATENT DOCUMENTS

| 5,735,631 | A  | * | 4/1998  | Patzelt et al. ................. 403/378 |
| 7,275,458 | B2 | * | 10/2007 | Kinme et al. ................... 74/493  |
| 7,731,266 | B2 | * | 6/2010  | Selle ........................ 296/107.01 |
| 7,731,446 | B2 | * | 6/2010  | Prause .......................... 403/372 |

(Continued)

FOREIGN PATENT DOCUMENTS

| JP | 2000-038146 | 2/2000 |
| JP | 2004-217135 | 8/2004 |
| JP | 2005-008022 | 1/2005 |

(Continued)

*Primary Examiner* — Nicole Verley
(74) *Attorney, Agent, or Firm* — Hartman Global IP Law; Gary M. Hartman; Domenica N. S. Hartman

(57) ABSTRACT

A steering column support apparatus for an electric power-steering apparatus with a tilt mechanism is achieved that is capable of sufficiently maintaining support rigidity of a tilt pivot shaft 15a to support a pivot bracket 28, and keeping the resistance when performing a tilt operation low with the durability of the side plate sections 32c of a pair of bushings 30c sufficiently maintained. The portions of the outer circumferential surface of the tilt pivot shaft 15a and the inner circumferential surface of the through hole 29 that hold the cylindrical sections 31 of the bushings 30c are cylindrical surfaces. Moreover, main contact surface sections 36, which come in contact with the inner side surfaces of support plate sections 23 in the neutral state in which there is no assist reaction force, and sub contact surface sections 37, which do not come in contact with the support plate sections 23 in the neutral state, and come in contact with the inside surfaces of the support plate sections 23 only when there is elastic deformation due to the occurrence of an assist reaction force, are formed on outside surfaces of the side plate sections 32c of the bushings 30c.

13 Claims, 26 Drawing Sheets

(56) References Cited

U.S. PATENT DOCUMENTS

| | | | |
|---|---|---|---|
| 8,978,201 B2 * | 3/2015 | Vess et al. | 16/2.1 |
| 2009/0266640 A1 * | 10/2009 | Oshima et al. | 180/444 |
| 2011/0100148 A1 * | 5/2011 | Jung | 74/492 |
| 2014/0197293 A1 * | 7/2014 | Fujiwara et al. | 248/274.1 |
| 2015/0203146 A1 * | 7/2015 | Kii et al. | B62D 1/89 |

FOREIGN PATENT DOCUMENTS

| | | |
|---|---|---|
| JP | 2005-030329 | 2/2005 |
| JP | 2008-030728 | 2/2008 |
| JP | 2009-190679 | 8/2009 |
| JP | 2010-095131 | 4/2010 |
| WO | 2010-016252 | 2/2010 |

\* cited by examiner (A)          (B)

(A)  (B)

STEERING COLUMN SUPPORT APPARATUS

TECHNICAL FIELD

The present invention relates to an electric power steering apparatus that comprises a tilt mechanism that makes it possible to adjust the height position of a steering wheel, and particularly to a steering column support apparatus for supporting the steering column by the vehicle side such that pivoting is possible.

BACKGROUND ART

Normally, a tilt mechanism that makes it possible to adjust the height position of the steering wheel, and a telescopic mechanism that makes it possible to adjust the forward-backward position of the steering wheel according to the size and driving posture of the driver are assembled in the steering apparatus of an automobile. Moreover, assembling an electric power steering apparatus that uses an electric motor as a power source and that is able to reduce the force necessary for the operator to operate the steering wheel is also widely performed. FIG. 25 illustrates a conventional example of an electric power steering apparatus that comprises a tilt mechanism and a telescopic mechanism.

The steering apparatus comprises: a steering shaft 2 to which a steering wheel 1 is fastened to the rear end section thereof, a steering column 3 that supports the steering shaft 2 on the inside thereof so as to be able to rotate freely, an electric assist apparatus 4 for applying an assist torque to the steering shaft 2, and a steering gear unit 6 for pushing or pulling a pair of left and right tie rods 5 according to the rotation of the steering shaft 2. In this specification, the forward-backward direction is the forward-backward direction of the vehicle body.

In an electric power steering apparatus, the steering shaft 2 is constructed so as to be able to expand and contract in the axial direction by combining an inner shaft 7 that is located on the front side and an outer shaft 8 that is located on the rear side such that torque can be transmitted and such that relative displacement in the axial direction is possible. Moreover, the steering column 3 is constructed so as to be able to expand and contract in the axial direction by combining an inner column 9 that is located on the front side and an outer column 10 that is located on the rear side such that relative displacement in the axial direction is possible. The outer shaft 8 is supported on the inside of the outer column 10 such that displacement in the axial direction with respect to the outer column 10 is suppressed, and so as to be able to rotate freely.

The front end section of the inner column 9 is connected and fastened to the rear end surface of a housing 11 of the electric assist apparatus 4. On the other hand, the inner shaft 7 is inserted inside the housing 11, and the front end section thereof is connected to the input shaft of the electric assist apparatus 4. Moreover, the front end section of the output shaft 12 of the electric assist apparatus 4, which is connected to the input shaft by way of a torsion bar, protrudes from the front end surface of the housing 11 and is connected to the input shaft 21 of the steering gear unit 6 by way of a universal joint 18, and intermediate shaft 19 and another universal joint 20.

The inner column 9 is supported by a front support bracket 13 by part of the vehicle body 14 by way of the housing 11. In order to achieve the tilt mechanism, the front support bracket 13 supports the housing 11 so as to be able to pivot freely around a tilt pivot shaft 15 that extends in the width direction of the vehicle body 14 (front-back direction in FIG. 25) and that is supported by the front support bracket 13.

The middle section of the outer column 10 is supported by a rear support bracket 16 by part of the vehicle body 14. In order to achieve the tilt mechanism and the telescopic mechanism, the outer column 10 is supported by the rear support bracket 16 so as to be able to be switched between a fixed state, in which movement in the forward-backward direction and movement in the up-down direction is not possible, and a non-fixed state, in which movement in the forward-backward direction and movement in the up-down direction is possible. In regards to this kind of support construction, various kinds of construction are known and are not the features of the present invention, so the detailed explanation is omitted.

In the case of this kind of electric power steering apparatus, when adjusting the height position and forward-backward position of the steering wheel 1, by rotating an adjustment handle 17 (see FIG. 26) in a specified direction (normally downward), the middle section of the outer column 10 is set in the non-fixed state with respect to the rear support bracket 16. Then, in this state, the height position of the steering wheel 1 is adjusted by pivoting the steering column 3 around the tilt pivot shaft 15. Moreover, the forward-backward position of the steering wheel 1 is adjusted by expanding or contracting the steering column 3 and steering shaft 2. After adjustment, by rotating the adjustment handle 17 in a direction opposite the specified direction (normally upward), the middle section of the outer column 10 is set in the fixed state with respect to the rear support bracket 16.

Moreover, the electric assist apparatus 4 is constructed such that when a torque is applied to the steering shaft 2 from the steering wheel 1 during steering, the direction and size of the torque is detected by a torque sensor that is provided inside the housing 11, and according to the detected torque, an electric motor 22 that is supported by the outer surface of the housing 11 applies an assist torque (assist force) to the output shaft 12 by way of a worm reducer that is provided on the inside of the housing 11.

In an electric power steering apparatus that comprises this kind of position adjustment mechanism for a steering wheel 1, as disclosed in JP3707252 (B2), by assembling bushings in the sliding portion of the tilt pivoting portion, which is the portion around which the steering column 3 pivots, it is possible to improve the durability of this tilt pivoting portion. FIG. 26 to FIG. 31 illustrate a first example of conventional construction of a steering column support apparatus for an electric power steering apparatus in which bushings are assembled in the tilt pivoting portion.

The front support bracket 13a is made using a metal plate such as steel plate, and has a pair of parallel support plate sections 23 that are separated in the width direction of the vehicle body 14 (front-back direction in FIG. 26 and FIG. 30, and left-right direction in FIG. 27, FIG. 28 and FIG. 29). Moreover, the tilt pivot shaft 15a is located in the width direction of the vehicle body 14 so as to be spanned between the bottom portions near the bottom ends of the pair of support plate sections 23. The tilt pivot shaft 15a is composed of a tilt bolt 24 that is made of a metal material such as steel, and a cylindrical sleeve 25 that is made of a metal material such as steel, aluminum alloy or the like. The tilt bolt 24 is installed so as to be spanned between the support plate sections 23 by inserting the rod section thereof through a pair of circular holes 26 that are concentrically formed in portions near the bottom ends of the pair of support plate sections 23, then screwing a nut 27 on a male screw section that is formed on the tip end section of the rod section, and by tightening. Furthermore, the sleeve 25 is fitted around the outside of the rod section of the tilt bolt 24, and held and fastened between the support plate sections 23 by tightening the nut 27.

The housing 11a of the electric assist apparatus 4a is made of a metal material such as an aluminum alloy, and a pivot bracket 28 is integrally provided on the front end section thereof. A through hole 29 is formed in the tip end section of the pivot bracket 28 in the width direction of the vehicle body 14. The inner circumferential surface of the through hole 29 is composed of a stepped cylindrical surface wherein the inner-diameter dimension of both end sections in the axial direction is a little larger than the inner-diameter dimension of the middle section in the axial direction. Both end sections in the axial direction and the middle section in the axial direction of this stepped cylindrical surface are concentric with each other. The front end section to the middle section of the pivot bracket 28 is located between the support plate sections 23, and by supporting the pivot bracket 28 between the support plate sections 23 by way of tilt bolt 24 and sleeve 25 that are inserted through the through hole 29, the housing 11a and the steering column 3a are supported by the front support bracket 13a so as to be able to pivot around the tilt pivot shaft 15a.

A pair of bushings 30 are fitted around the both end sections in the axial direction of the sleeve 25 of the tilt pivot shaft 15a. Each bushing 30 is formed into a tubular shape as a whole using an elastic material that includes a synthetic resin such as a polyamide resin, and an elastomer such as rubber or vinyl, or is formed using a low-friction material such as an oil impregnated metal, and comprises a cylindrical section 31; and a ring-shaped (outward facing flange section) side plate section 32 that extends outward in the radial direction from one end section in the axial direction of the cylindrical section 31. The cylindrical sections 31 of the bushings 30 are held between both end sections in the axial direction of the outer circumferential surface of the sleeve 25 and both end sections in the axial direction of the inner circumferential surface of the through hole 29 such that there is no loose movement in the radial direction. The side plate sections 32 of the bushings 30 are held between both side surfaces in the width direction of the pivot bracket 28 and the inside surface of the support plate sections 23 such that there is no loose movement in the axial direction.

In the case of this kind of conventional construction, the bushings 30 are attached to both end sections in the axial direction of the tilt pivot shaft 15a, so when adjusting the height position of the steering wheel 1, not only is direct rubbing between the tilt pivot shaft 15a and the pivot bracket 28 prevented even though the pivot bracket 28 pivots around the tilt pivot shaft 15a, but also direct rubbing between the support plate sections 23 and the pivot bracket 28 is prevented. Therefore, gaps in the tilt pivot portion that is composed of these members that are caused by advancing wear and plastic deformation due to direct rubbing between these members, which becomes the cause of looseness, is avoided.

In the case of an electric power steering apparatus, when the electric assist apparatus 4a applies an assist force to the output shaft 12a, the assist reaction force, which is the reaction force to the assist force, is applied to the housing 11a in the direction opposite the direction of rotation of the output shaft 12a. As a result, the pivot bracket 28 of the housing 11a receives the assist reaction force and tends to displace and incline in the direction opposite the direction of rotation of the output shaft 12a with respect to the tilt pivot shaft 15a and support plate sections 23. In doing so, the bushings 30 are elastically compressed between the tilt pivot shaft 15a and support plate sections 23 and the pivot bracket 28, or is pressed in the compressive direction, and by supporting the assist reaction force, suppresses displacement and inclination of the pivot bracket 28. As a result, direct rubbing between the pivot bracket 28 and the tilt shaft 15a and support plate sections 23 is prevented.

Incidentally, in the case of the first example of conventional construction, in order to maintain the support capability of the bushings 30 to support the assist reaction force, or in other words, in order to maintain the capability to suppress displacement and inclination of pivot bracket 28, the length in the axial direction of the cylindrical sections 31 and the height in the radial direction of the side plate sections 32 are increased somewhat. Moreover, the inside surfaces of the support plate sections 23 and both side surfaces of the pivot bracket 28, and both side surfaces of the side plate sections 32 are all parallel planes. Therefore, in the neutral state where the assist force is not generated, both side surfaces of the side plate sections 32, the inside surfaces of the support plate sections 23 and both side surfaces of the pivot bracket 28 are in contact over nearly the entire surface. Consequently, the contact surface area between both the inner and outer circumferential surfaces of the cylindrical sections 31 and the opposing surfaces (outer circumferential surface of the tilt pivot shaft 15a, or the inner circumferential surface of the through hole 29 of the pivot bracket 28), and the contact surface area between both side surfaces of the side plate sections 32 and the opposing surfaces (inside surfaces of the support plate sections 23, or both side surfaces of the pivot bracket 28) are increased by the amount that the length in the axial direction of the cylindrical sections 31, and the height in the radial direction of the side plate sections 32 are increased.

On the other hand, in the case of the first example of conventional construction, when adjusting the height position of the steering wheel 1, as the pivot bracket 28 pivots around the tilt pivot shaft 15a, sliding in the circumferential direction occurs at the contact area between at least one of the surfaces of the inner circumferential surfaces of the cylindrical sections and the outside surfaces of the side plate sections 32, and the outer circumferential surfaces of the cylindrical sections 31 and the inside surfaces of the side plate sections 32 of the bushings 30 and the opposing surface that faces this surface. The friction force that acts at this contact area becomes resistance when adjusting the height position of the steering wheel 1, so preferably this friction force is kept as low and stable as possible. However, because the contact surface area between both the inner and outer circumferential surfaces of the cylindrical section 31 and both side surfaces of the side plate sections 32 and the opposing surfaces are increased, the friction force that acts at the contact areas between the surfaces of the bushings 30 and the opposing surfaces is affected by the characteristics of these opposing surfaces, and becomes relatively high and unstable, so there is a possibility that the operational feeling when adjusting the height position of the steering wheel 1 will become bad.

On the other hand, FIG. 32A and FIG. 32B illustrate a second example and third example of conventional construction of a steering column support apparatus for an electric power steering apparatus as disclosed in JP2008-30728 A. In the construction of these examples, the inner circumferential surface of a through hole 29a that is formed in a pivot bracket 28a is caused to incline in a direction going away from the outer circumferential surfaces of cylindrical sections 31a of bushings 30a (30b) in going from the center section in the axial direction toward both end sections. As a result, cylindrical shaped gaps 33 having a wedge shaped cross section are formed in the portions on both sides of the center section in the axial direction between the inner circumferential surface of the through hole 29a and the outer circumferential surface of the cylindrical sections 31a. In the case of the second example of conventional construction illustrated in FIG. 32A, the outside surfaces of the side plate sections 32a of the bushings 30a are caused to incline in a direction going away from the inside surfaces of the of the support plate sections 23 in a direction outward in the radial direction. As a result, circular ring shaped gaps 34a having a wedge shaped cross section are formed between the outside surfaces of the side plate sections 32a and the inside surfaces of the support plate sections 23. On the other hand, in the case of the third example of conventional construction illustrated in FIG. 32B, the inside surfaces of the side plate sections 32b of the bushings 30b are caused to incline in a direction going away from the outside surfaces of the pivot bracket 28a in a direction outward in the radial direction. As a result, circular ring shaped gaps 34b having a wedge shaped cross section are formed between the inside surfaces of the side plate sections 32a and the outside surfaces of the pivot bracket 28a. Due to the existence of gaps 33, 34a, 34b that are formed in this way, the pivot bracket 28a (center axis of the through hole 29a) more easily inclines with respect to the center axis of the tilt pivot shaft 15a.

Due to errors in the shape of the front support bracket 13a and the rear support bracket 16a, and due to an installation error when attaching the brackets to the vehicle body 14 (see FIG. 26), the guide direction in which the rear support bracket 16a guides the middle section of the steering column 3a during the tilting operating (see FIG. 26) may incline with respect to an imaginary plane that is orthogonal to the center axis of the tilt pivot shaft 15a. In the second and third examples of conventional construction, even in these cases, by the pivot bracket 28a inclining with respect to the center axis of the tilt pivot shaft 15a, the pivoting direction of the steering column 3a during height position adjustment of the steering wheel 1 (see FIG. 25), and the direction that the middle section of the steering column 3a is guided coincide with each other. Therefore, it is possible to avoid improper adjustment of height position of the steering wheel 1 due to discrepancy between the pivoting direction and the guide direction.

Furthermore, in the case of the second and third examples of conventional construction, the contact surface area between the inner circumferential surface of the through hole 29a and the outer circumferential surface of the cylindrical sections 31a decreases due to the existence of the gaps 34a, 34b. Therefore, it is possible to reduce the friction force that acts between the inner circumferential surface of the through hole 29a and the outer circumferential surface of the cylindrical sections 31a. Moreover, in the second example of conventional construction, it is possible to reduce the contact pressure between both side surfaces of the pivot bracket 28a and the inside surfaces of the side plate sections 32a, 32b (see FIG. 32A), and in the third example of conventional construction, it is possible to reduce the contact surface area between these areas (see FIG. 32B). Therefore, it is possible to stably reduce the friction forces that act between these surfaces, and by allowing slipping between the pivot bracket 28a and bushings 30a, 30b, it is possible to keep the resistance low when adjusting the height position of the steering wheel 1, and improve the workability of this height position adjustment.

However, in the case of the second and third examples of conventional construction, the support rigidity of supporting the pivot bracket 28a by the tilt pivot shaft 15a becomes low due to the existence of the gaps 33, and the support rigidity of supporting the steering wheel 1 (see FIG. 25) also becomes low. As a result, there is a possibility that the driver will have an uncomfortable feeling. Due to the assist reaction force that occurs during steering, the pivot bracket 28a inclines a relative large amount with respect to the center axis of the tilt pivot shaft 15a particularly due to the existence of gaps 33 of the gaps 33, 34a, 34b. Also due to this, there is a possibility that the driver will have an uncomfortable feeling.

RELATED LITERATURE

Patent Literature

[Patent Literature 1] JP3707252 (B2)
[Patent Literature 2] JP2008-30728 A

SUMMARY OF INVENTION

Problem to be Solved by Invention

In consideration of the situation described above, the object of the present invention is to achieve construction of a steering column support apparatus for an electric power steering apparatus that is capable of stably keeping the friction force acting between the surfaces of a pair of bushings and the opposing surfaces that face those surfaces when adjusting the height position of the steering wheel while at the same time maintaining support performance of supporting the assist reaction force by that pair of bushings.

Means for Solving the Problems

The steering column support apparatus of the present invention is particularly applied to an electric power steering apparatus with a tilt mechanism. The steering column support apparatus of the present invention comprises a front support bracket, a tilt pivot shaft, a pivot bracket and a pair of bushings.

The front support bracket is fastened to a vehicle body and has a pair of support plate sections that are parallel with each other and separated in the width direction of the vehicle body. Moreover, the tilt pivot shaft is arranged in the width direction of the vehicle body so as to be spanned between the side plate sections. Furthermore, the pivot bracket is provided on part of a housing of an electric assist apparatus, and has a through hole through which the tilt pivot shaft is inserted and supports a steering column, which supports a steering shaft so as to be able to freely rotate, by way of the housing.

The pair of bushings are made of an elastic material or a low-friction material, and formed into an annular shape. Moreover, these bushings are fitted around the both end sections in the axial direction of the tilt pivot shaft, and each bushing has a cylindrical section that is held between the outer circumferential surface of the tilt pivot shaft and the inner circumferential surface of the through hole, and a circular ring-shaped side plate section that extends outward in the radial direction from one end section in the axial direction of the cylindrical section, and is held between the side surface of the pivot bracket and the inside surface of the support plate section. Each of these bushings is such that in the neutral state where at least an assist force that is applied to the steering shaft from the electric assist apparatus is not generated, a thinned section is provided on part of at least one of both circumferential surfaces of the cylindrical section, or part of at least one of both side surfaces of the side plate section so as not to come in contact with the opposing surfaces that face these surfaces.

In one embodiment of the present invention, the thinned section is a concave section that is provided on at least one of both side surfaces of the side plate section.

In this case, in each bushing, a main contact surface section, which comes in contact with the opposing surface in at least the neutral state, is formed on one half in the radial direction of at least one of both side surfaces of the side plate section, and a sub contact surface section, which does not come in contact with the opposing surface in at least the neutral state, and comes in contact with the opposing surface only when the side plate section elastically deforms due to the reaction force of the assist force, is formed on the other half section in the radial direction; and this sub contact surface section forms a concave section. In this construction, it is possible to provide the main contact surface section on the radially inside, and provide the sub contact surface section on the radially outside. Adversely, it is possible to provide the main contact surface section on the radially outside, and provide the sub contact surface section on the radially inside.

Alternatively, the concave section can be provided in the middle section in the radial direction of at least one of both side surfaces of the side plate section. In this case, the concave section can be concave grooves that extend in the radial direction and that are provided at a plurality of locations in the circumferential direction of at least one of both side surfaces of the side plate section, or, the concave section can be a concave groove that extends in the circumferential direction of at least one of both side surfaces of the side plate section. This concave groove can be formed along the whole perimeter of at least one of both side surfaces of the side plate section. However, this concave groove can be composed of a plurality of arc shaped concave grooves that are arranged in the circumferential direction.

In another embodiment of the present invention, the thinned section is formed to pass through in the thickness direction at least one location in the circumferential direction of at least one of the cylindrical section and the side plate section. In this case, the thinned section can be a non-continuous section in at least one location in the circumferential direction of at least one of the cylindrical section and side plate section such that part in the circumferential direction is non continuous, or can be a notch that is open in an end edge of at least one of the cylindrical section and side plate section, or can be a through hole that passes through in the thickness direction at least one of the cylindrical section and side plate section.

In the steering column support apparatus of the present invention, the portions of the outer circumferential surface of the tilt pivot shaft and the inner circumferential surface of the through hole that hold the cylindrical section of the bushing are cylindrical surfaces whose diameter does not change along the axial direction, and preferably the cylindrical section of each bushing is supported between the outer circumferential surface of the tilt pivot shaft and the inner circumferential surface of the through hole such that there is no loose movement.

Effect of the Invention

With the steering column support apparatus of the present invention, it is possible to stably keep the friction force that acts between the surfaces of the bushings (circumferential surfaces of the cylindrical sections or the side surfaces of the side plate sections) and the opposing surfaces that face these surfaces low when adjusting the height position of the steering wheel even when the support capability of the pair of bushings to support the assist reaction force is maintained. In other words, thinned sections are provided on part of at least the circumferential surfaces of the cylindrical surfaces or the side surfaces of the side plate sections that form the bushing, and in the neutral state where at least the assist force is not generated, the thinned sections do not come in contact with the opposing surfaces that face these surfaces. Therefore, workability of the operation of adjusting the height position of the steering wheel is improved by reducing the contact surface area between the surfaces of the bushings and the opposing surfaces by the amount of the thinned section, and by stably keeping the friction force that acts on the contact areas between the surfaces of the bushings and the opposing surfaces and that becomes resistance when adjusting the height position of the steering wheel low.

MODES FOR CARRYING OUT INVENTION

First Example

Figure 1:
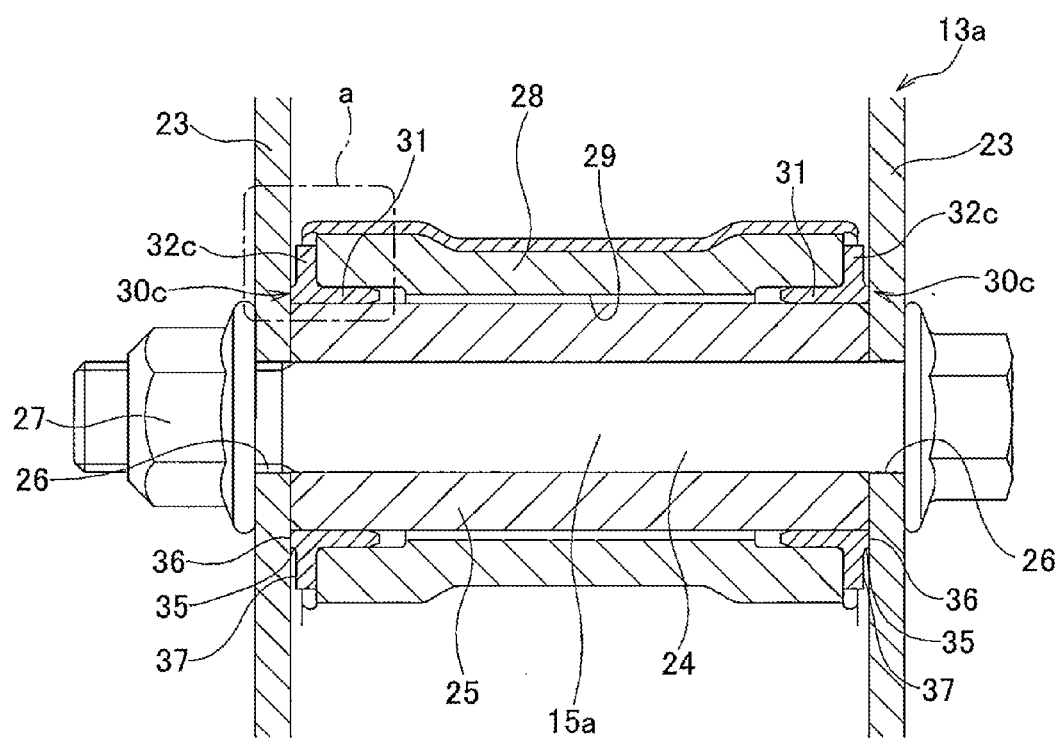
FIG. 1 is an enlarged view illustrating a cross section of the tilt pivot portion of a first example of an embodiment of the present invention.
Figure 2:
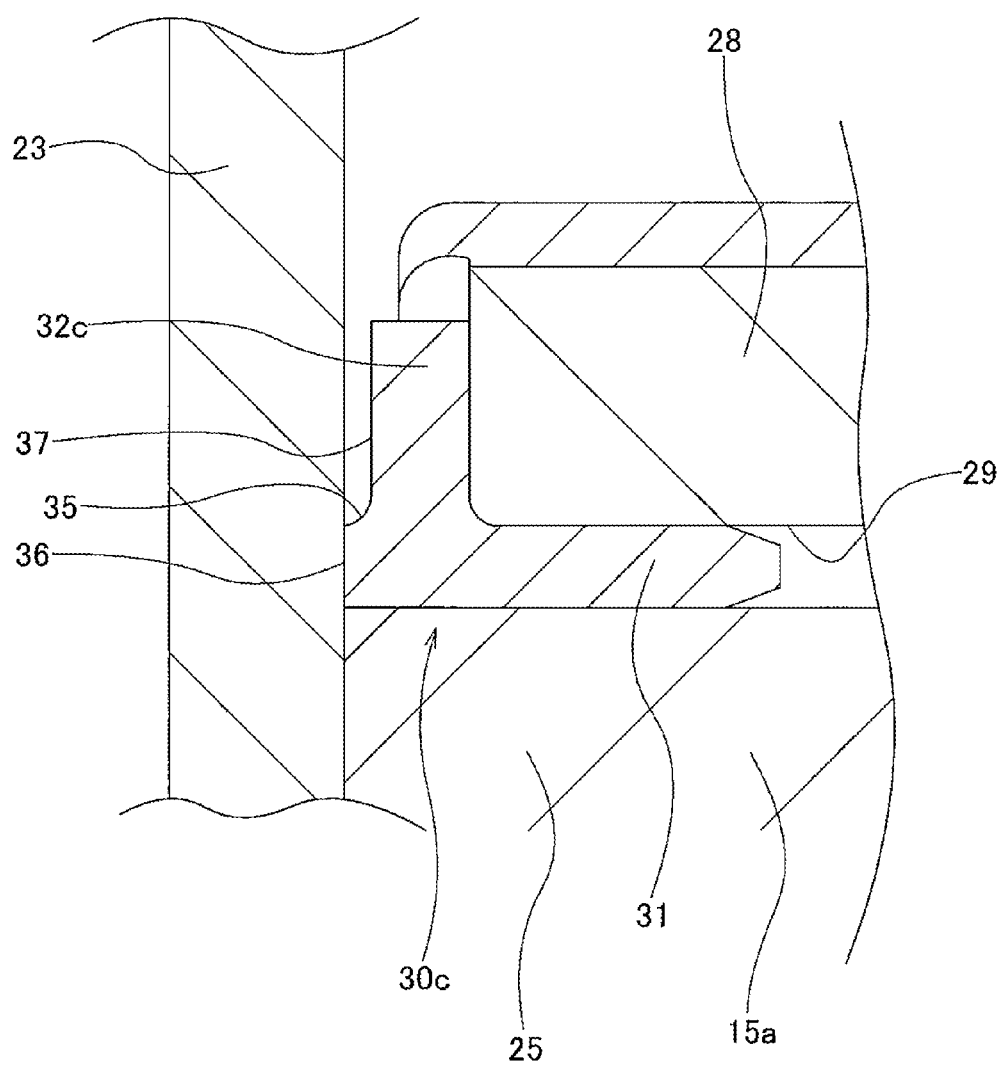
FIG. 2 is an enlarged view of part a in FIG. 1.

FIG. 1 and FIG. 2 illustrate a first example of an embodiment of the present invention. The steering column support apparatus of the present invention is particularly applied to an electric power steering apparatus that comprises a tilt mechanism. The steering column support apparatus of the present invention comprises a front support bracket 13a, a tilt pivot shaft 15a, a pivot bracket 28, and a pair of bushings 30c. The front support bracket 13a is fastened to the vehicle body and has a pair of support plate sections 23 that are parallel with each other and that are separated in the width direction of the vehicle body. The tilt pivot shaft 15a is arranged in the width direction of the vehicle body in a state so as to be spanned between the support plate sections 23. The pivot bracket 28 is provided in part of a housing of an electric assist apparatus, and has a through hole 29 through which the tilt pivot shaft 15a is inserted. Each of the bushings 30c is made of an elastic material that includes a synthetic resin such as polyamide resin and an elastomer such as rubber or vinyl, or is made of a low-friction material such as an oil impregnated metal, and is entirely formed into an annular shape and comprises a cylindrical section 31 that is fitted around either of both end sections in the axial direction of the tilt pivot shaft 15a, and is held between the outer circumferential surface of the tilt pivot shaft 15a and the inner circumferential surface of the through hole 29; and a circular ring shaped side plate section 32c that extends outward in the radial direction from one end section in the axial direction of the cylindrical section 31, and is held between the side surface of the pivot bracket 28 and the inside surface of the support plate section 23. A feature of this example is the shape of the outside surface of the side plate sections 32c of these bushings 30c, and the structure of the installation places of the cylindrical sections 31 of the bushings 30c. The construction and functions of the other parts are the same as in the first example of conventional construction.

In this example, of both side surfaces of the side plate sections 32c of each of the bushings 30c, the inside surface that faces either of both side surfaces of the pivot bracket 28 is composed of a single circular ring surface. On the other hand, of both side surfaces of the side plate sections 32c, stepped section 35 is formed on the outside surface that faces the inside surface of either of the pair of support plate sections 23 of the front support bracket 13a in the portion near the inner circumference. As a result, the outside surface of the side plate section 32c is composed of a stepped circular ring surface where the outside portion of one half section of the portions on both sides in the radial direction of the stepped section is recessed toward the inside in the axial direction with respect to the inside portion of the other half section. The radially inside portion of the portions on both sides in the radial direction of the stepped section 35 is a single circular ring shaped main contact surface section 36, and the radially outside portion is a single circular ring-shaped sub contact surface section 37 that is concentric with the main contact surface section 36. Moreover, as illustrated in FIG. 1 and FIG. 2, in the neutral state in which there is no assist reaction force, nearly the entire inside surfaces of the side plate sections 32c each come in contact with the both side surfaces of the pivot bracket 28. On the other hand, the outside surfaces of the side plate sections 32c are such that only the main contact surface sections 36 on the inside in the radial direction come in contact with the inside surfaces of the support plate sections 23. In other words, in this state, of the outside surfaces of the side plate sections 32c, the sub contact surface sections 37 on the outside in the radial direction do not come in contact with the inside surfaces of the side plate sections 23, but face the inside surfaces of the support plate sections 23 through small gaps.

On the other hand, the cylindrical sections 31 of the bushings 30c are held between both end sections, which are cylindrical surfaces of which each of the diameter does not change along the axial direction, in the axial direction of the outer circumferential surfaces of the sleeve 25 of the tilt pivot shaft 15a, and the both end sections in the axial direction of the inner circumferential surface of the through hole 29 that is formed in the pivot bracket 28. In other words, as illustrated in FIG. 1 and FIG. 2, in the neutral state, nearly the entire surface of both the inner and outer circumferential surfaces of the cylindrical sections 31 (portions except at least the beveled sections on both the inner and outer circumferential edges in the radial direction of both end sections in the axial direction) come in contact without gaps with both end sections of the outer circumferential surface of the sleeve 25 and both end sections of the inner circumferential surface of the through hole 29.

With the steering column support apparatus of this example, it is possible to sufficiently maintain the support rigidity of the tilt pivot shaft 15a to support the pivot bracket 28, and it is possible to sufficiently suppress the amount of incline of the pivot bracket 28 with respect to the center axis of the tilt pivot shaft 15a due to the assist reaction force that occurs during steering. Moreover, in a state of sufficiently maintaining the durability of the side plate sections 32c of the bushings 30c, it is possible to keep the resistance low when adjusting the height position of the steering wheel 1 (see FIG. 25).

In other words, in this example, the portions of outer circumferential surface of the sleeve 25 of the tilt pivot shaft 15a and the portions of the inner circumferential surface of the through hole 29 that hold the cylindrical sections 31 of the bushings 30 are cylindrical surfaces whose diameters do not change in the axial direction. Moreover, in the neutral state, these cylindrical surface come in contact with nearly no gaps all the way around the inner and outer circumferential surfaces of the cylindrical sections 31 (except for the beveled sections on at least both end sections). Therefore, it is possible to sufficiently maintain the support rigidity of the tilt pivot shaft 15a to support the pivot bracket 28. Moreover, in the case that the pivot bracket 28 inclines with respect to the center axis of the tilt pivot shaft 15a due to the assist reaction force, it is possible for the cylindrical sections 31 to efficiently support the assist reaction force. Therefore, it is possible to keep the amount of this inclination sufficiently low.

Furthermore, in the case of this example, in the neutral state, which is also the state of adjusting the height position of the steering wheel 1, the outside surfaces of the side plate sections 32c of the bushings 30c come in contact with the inside surfaces of the support plate sections 23 at only the main contact surface sections 36, and do not come in contact at the sub contact surface sections 37. Therefore, in the neutral state, it is possible to reduce the contact surface area between the outside surfaces of the side plate sections 32c and the inside surfaces of the side plate sections 23, and to reduce the friction force that acts at the contact area between these outside surfaces and inside surfaces. Consequently, by causing the outside surfaces of the side plate sections 32c and the inside surfaces of the support plate sections 23 to slide when adjusting the height position of the steering wheel 1, it is possible to keep the resistance when adjusting the height position of the steering wheel 1 low.

Moreover, in this example, when the pivot bracket 28 displaces toward one of the support plate sections 23 sides of the pair of support plate sections 23 and inclines with respect to the center axis of the tilt pivot shaft 15a due to the assist reaction force, at least a portion in the circumferential direction of the side plate sections 32c is pressed by both side surfaces of the pivot bracket 28 and elastically displaces. As a result, of the one of the side plate sections 32c, the outside surface of the portion that elastically deformed comes in contact with the inside surface of the support plate section 23 at the sub contact surface section 37 as well as at the main contact surface section 36. Therefore, in regards to the side plate sections 32c, it is possible to support the assist reaction force over a wide range that includes not only the portions that correspond to the main contact surface sections 36, but also the portions that corresponds to at least part of the sub contact surface sections 37. Furthermore, as the pivot bracket 28 displaces, the support plate sections 23 deform. Due to the deformation of the support plate sections 23, the radially outside of the side plate sections 32c receive an even stronger compression due to the deformation of the support plate sections 23. However, in the case of this example, back clearances are formed in these portions by the sub contact surface section 37, so it is possible to prevent abnormal wear of the side plate sections 32c. Therefore, it is possible to suppress strain of the side plate sections 32c due to the repeated loading of the assist reaction force, to sufficiently maintain the durability of the side plate sections 32c, and to prevent the occurrence of loose movement in the tilt pivot portion over a long period of time.

Second Example

Figure 3:
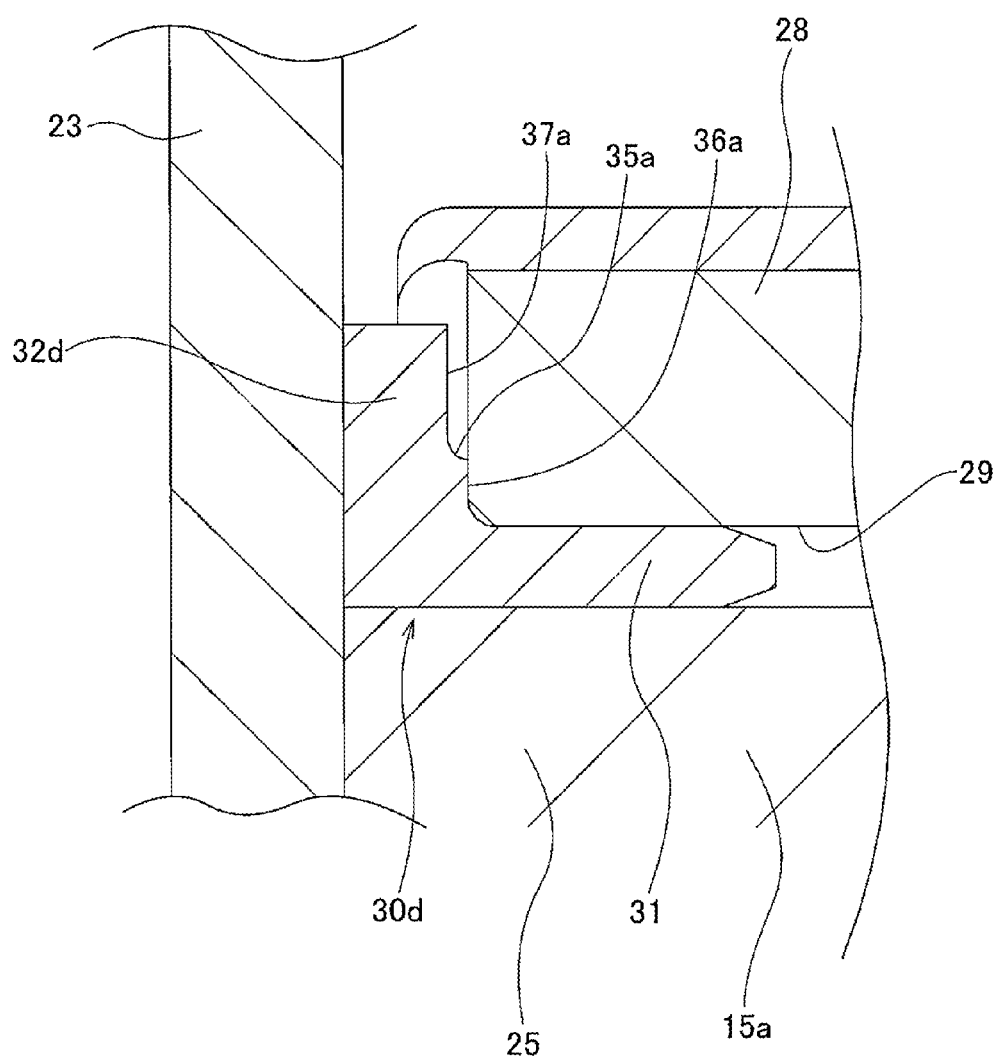
FIG. 3 is a drawing similar to FIG. 2, and illustrates a second example of an embodiment of the present invention.

FIG. 3 illustrates a second example of an embodiment of the present invention. In this example, the construction of both side surfaces of the side plate sections 32d of the pair of bushings 30d is opposite from that of the first example. In other words, in this example, the outside surfaces of the side plate sections 32d are composed of single circular ring surfaces, and the inside surfaces of the side plate sections 32d are composed of stepped circular ring surfaces such that main contact surface sections 36a on the radially inside and sub contact surface sections 37a on the radially outside are continuous by way of stepped sections 35a. As illustrated in FIG. 3, in the neutral state in which there is no assist reaction force, the entire outside surfaces of the side plate sections 32d are caused to come in contact with the inside surfaces of the support plate sections 23, and of the inside surfaces of the side plate sections 32d, only the main contact surface sections 36a come in contact with the side surfaces of the pivot bracket 28. In this example as well, due to the existence of the main contact surface sections 36a and sub contact surface sections 37a, it is possible to obtain the same effect as in the first example. The construction and functions of the other parts are the same as in the first example.

Third Example

Figure 4:
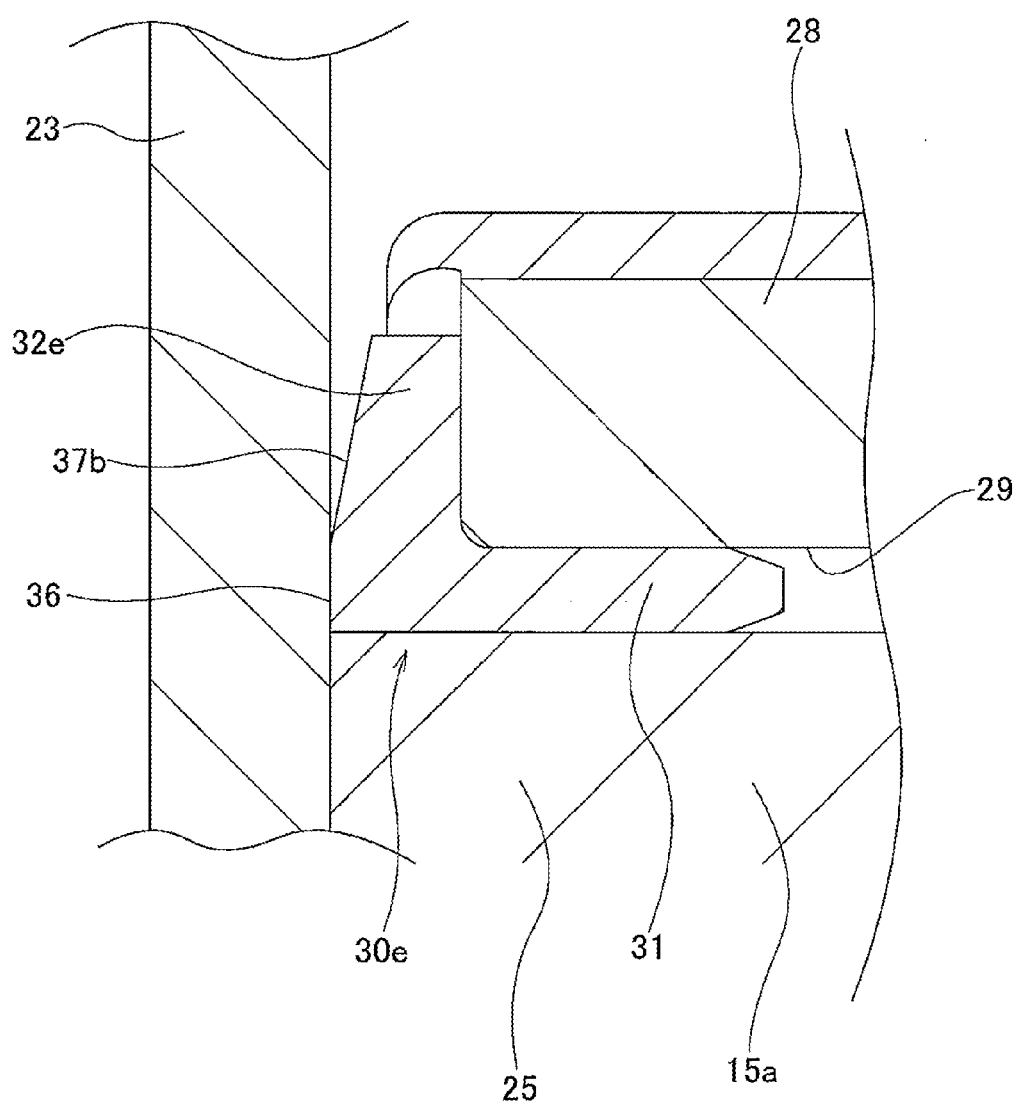
FIG. 4 is a drawing similar to FIG. 2, and illustrates a third example of an embodiment of the present invention.

FIG. 4 illustrates a third example of an embodiment of the present invention. In this example, the construction of the sub contact surface sections 37b that are formed on the radially outside portions of the outside surfaces of the side plate sections 32e of the pair of bushings 30e is different than in the first example. In other words, in this example, the inner circumferential edges of the sub contact surface sections 37b are directly continuous without a stepped section with the outer circumferential edges of the main contact surface sections 36 that are formed on the radially inside portions. Moreover, the sub contact surface sections 37b are composed of inclined surfaces that are inclined in a direction going away from the inside surfaces of the side plate sections 23 in a direction outward in the radial direction. In this example, the cross-sectional shape of the sub contact surface sections 37b, which are inclined surfaces, is a linear shape. However, this cross-sectional shape could also be a curved shape that curves in a direction so as to be a convex surface with respect to the inside surfaces of the side plate sections 23.

In this example, the main contact surface sections 36 that are formed on one side surface of the side plate sections 32e of the bushings 30 are flat surfaces that are parallel with the opposing surfaces, and the sub contact surface sections 37b are inclined surfaces that are inclined in a direction going away from the opposing surfaces in a direction outward in the radial direction. However, the entire one side surface of the side plate sections can also be inclined surfaces that are inclined in a direction going away from the opposing surfaces in a direction going outward in the radial direction, and of these inclined surfaces, the portions that come in contact with the opposing surfaces in the neutral state can be the main contact surface sections, and the portions that do not come in contact with the opposing surfaces can be the sub contact surface sections. The other construction and functions are the same as in the first example.

Fourth Example

Figure 5:
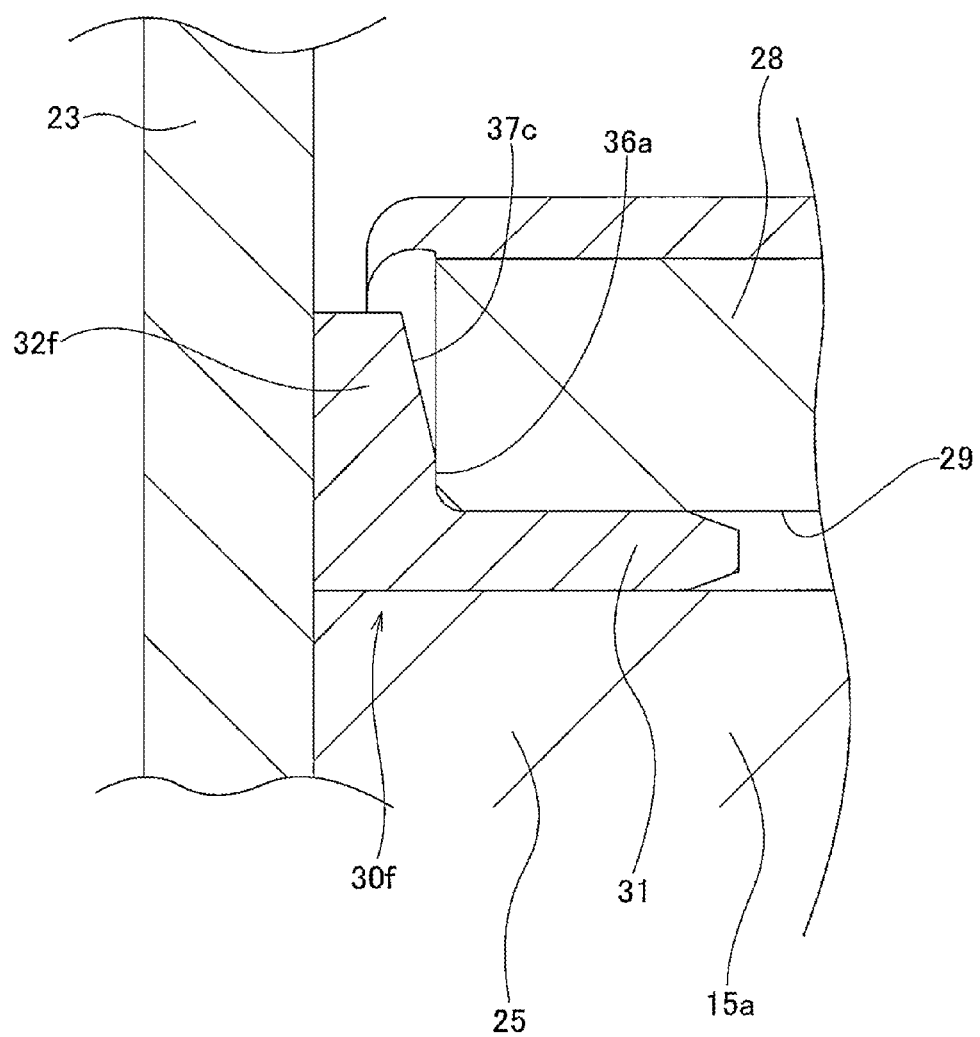
FIG. 5 is a drawing similar to FIG. 2, and illustrates a fourth example of an embodiment of the present invention.

FIG. 5 illustrates a fourth example of an embodiment of the present invention. In this example, the construction of the sub contact surface sections 37c that are formed in the radially outside portions of the inside surfaces of the side plate sections 32f is different than that in the second example. In other words, in this example, the inner circumferential edges of the sub contact surface sections 37c are directly continuous without a stepped section with the outer circumferential edges of the main contact surface sections 36a that are formed in the radially inside portions. Moreover, the sub contact surface sections 37c are composed of inclined surfaces that incline in a direction going away from the side surfaces of the pivot bracket 28 in a direction outward in the radial direction. The other construction and functions are the same as in the second and third examples.

Fifth Example

Figure 6:
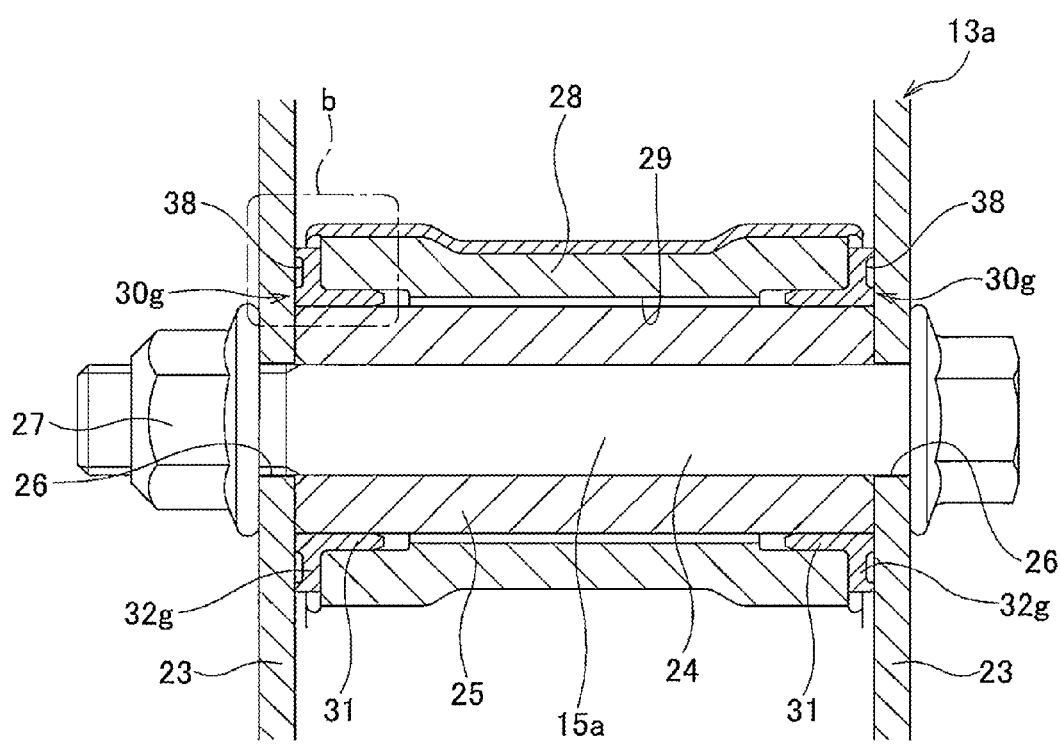
FIG. 6 is a drawing similar to FIG. 1, and illustrates a fifth example of an embodiment of the present invention.
Figure 7:
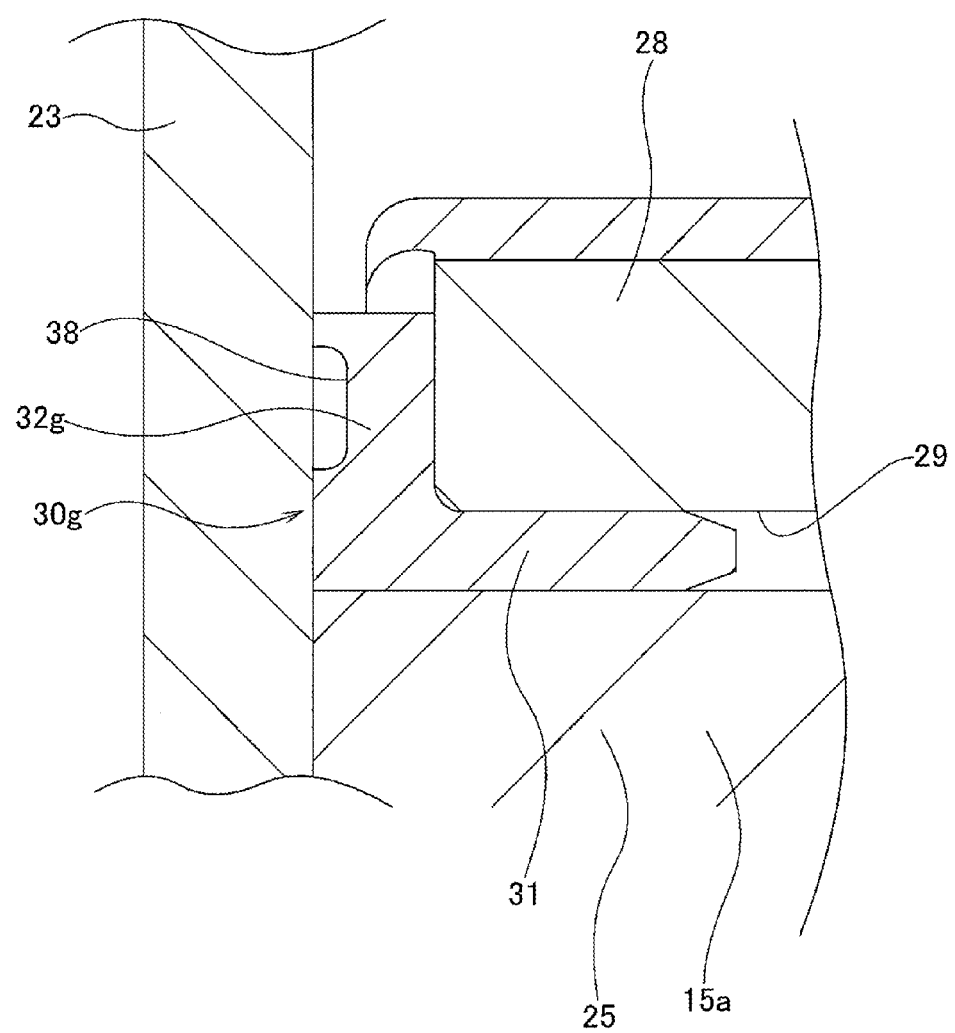
FIG. 7 is an enlarged view of part b in FIG. 6.
Figure 8:
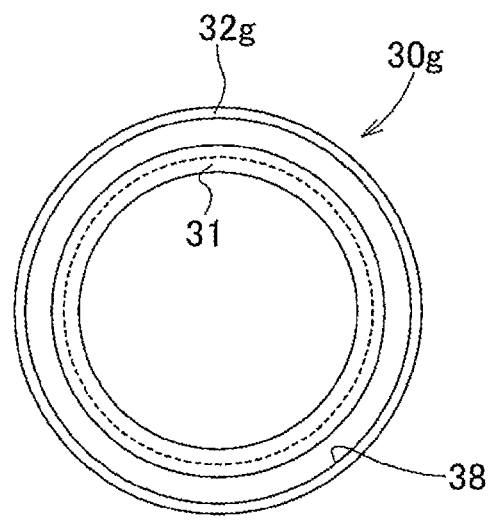
FIG. 8 is a view of a bushing that is assembled in the fifth example of an embodiment of the present invention as seen from the outside surface side of the side plate sections.

FIG. 6 to FIG. 8 illustrate a fifth example of an embodiment of the present invention. In this example, of both side surfaces of the side plate sections 32g of the bushings 30g, circular ring shaped concave grooves 38 that are continuous around the entire circumference are formed in the middle section in the radial direction of the outside surfaces so as to be concentric with the side plate sections 32g. In the neutral state in which at least there is no assist reaction force, only the portions of the outside surfaces of the side plate sections 32g that are separated from the concave grooves 38 come in contact with the inside surfaces of the support plate sections 23.

With the steering column support apparatus of this example, support capability of the side plate sections 32g of the bushings 30g to support the assist reaction force is maintained, so event when trying to sufficiently maintain the height in the radial direction of the side plate sections 32g, it is possible in the neutral state to reduce the contact surface area between the outside surfaces of the side plate sections 32g and the inside surfaces of the support plate sections 23 by the amount of the area of the opening of the concave grooves 38. Therefore, the friction force in the neutral state that acts at the contact areas between the outside surfaces of the side plate sections 32g and the inside surfaces of the support plate sections 23, which becomes resistance when adjusting the height position of the steering wheel 1 (see FIG. 25), can be stably kept low. Consequently, it is possible to prevent the friction force from becoming high and unstable, and making the workability of adjusting the height position of the steering wheel 1 bad.

Moreover, even when the radially outside of the side plate sections 32c receive strong compression due to deformation of the support plate sections 23, it becomes easy for the radially outside end sections of the side plate sections 32c to bend because the concave grooves 38 are formed in the side plate sections 32c, and thus it is possible to absorb the deformation of the side plate sections 32c and to prevent abnormal wear of the side plate sections 32c. Therefore, it is possible to suppress strain of the side plate sections 32c due to repeated loading of the assist reaction force, to sufficiently maintain durability of the side plate sections 32c, and to prevent the occurrence of loose movement on the tilt pivot portions over a long period of time.

When embodying this example, it is possible to reduce the friction force that acts at the contact areas between the surfaces of the bushings 30g (inner and outer circumferential surfaces of the cylindrical sections 31 and both side surfaces of the side plate sections 32g) and the opposing surfaces that face these surfaces (inner circumferential surface of the through hole 29, the outer circumferential surface of the sleeve 25, the inside surfaces of the support plate sections 23 and both side surfaces of the pivot bracket 28) by applying grease to the surfaces of the bushings 30g. In this case, it is possible to use the concave grooves 38 for collecting grease, so it is possible to increase the amount of grease held by the amount of the grooves, and thus maintain the effect of reducing the friction force longer. Moreover, it is also possible to form plural ring shaped concave grooves on the side surfaces of the side plate sections 32g. Furthermore, it is also possible to arrange a plurality of ring-shaped concave grooves having different diameters in an annular ring shape and preferably in a concentric shape.

Figure 9:
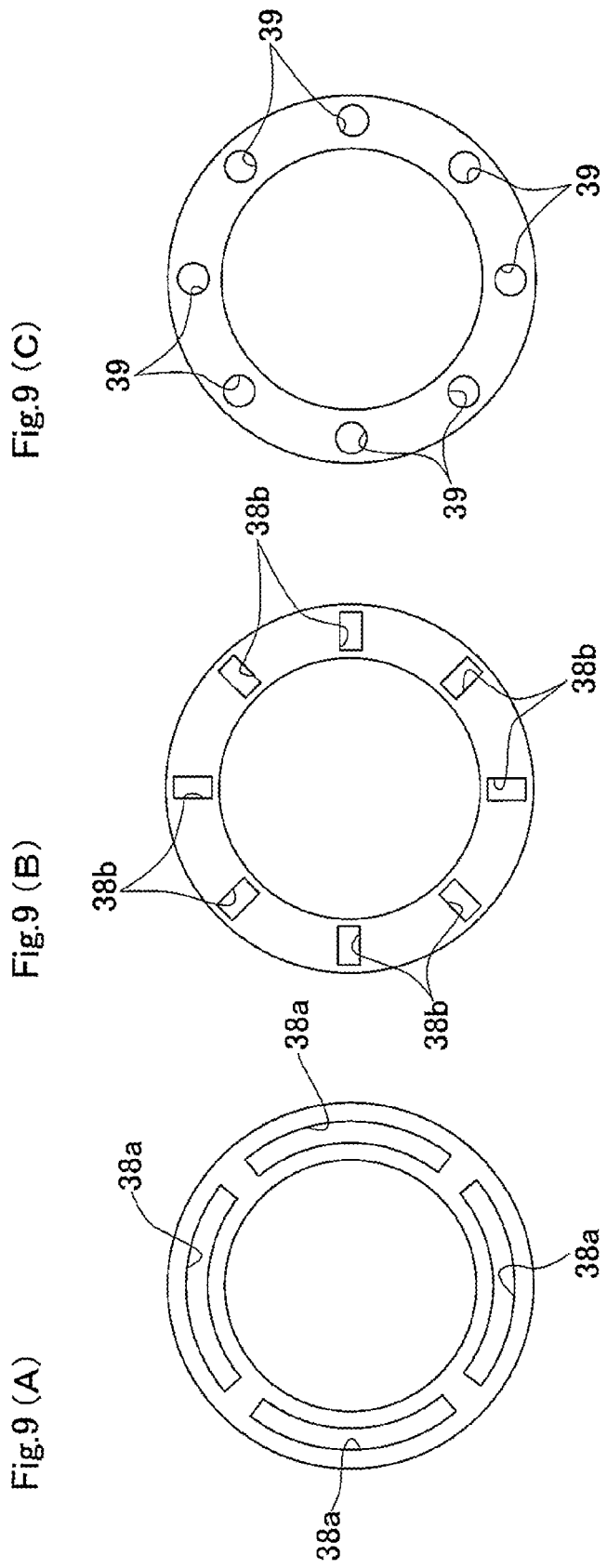
FIGS. 9A to 9C are drawings illustrating three examples of concave sections that are provided in the side surfaces of the side plate sections that can be assembled in the fifth example of an embodiment of the present invention.

The concave sections that are formed on the side surfaces of the side plate sections of the bushings are not limited to ring-shaped concave grooves 38 that are continuous around the entire circumference, and as illustrated in FIGS. 9A and 9B, a plurality of long arc shaped concave grooves 38a in the circumferential direction, or a plurality of long concave grooves 38b in the radial direction can be formed at uniform intervals in the circumferential direction, or as illustrated in FIG. 9(C), it is possible to apply construction in which circular concave sections 39 are formed at uniform intervals in the circumferential direction. The other construction and functions are the same as in the first example of an embodiment of the present invention and the first example of conventional construction.

Sixth Example

Figure 10:
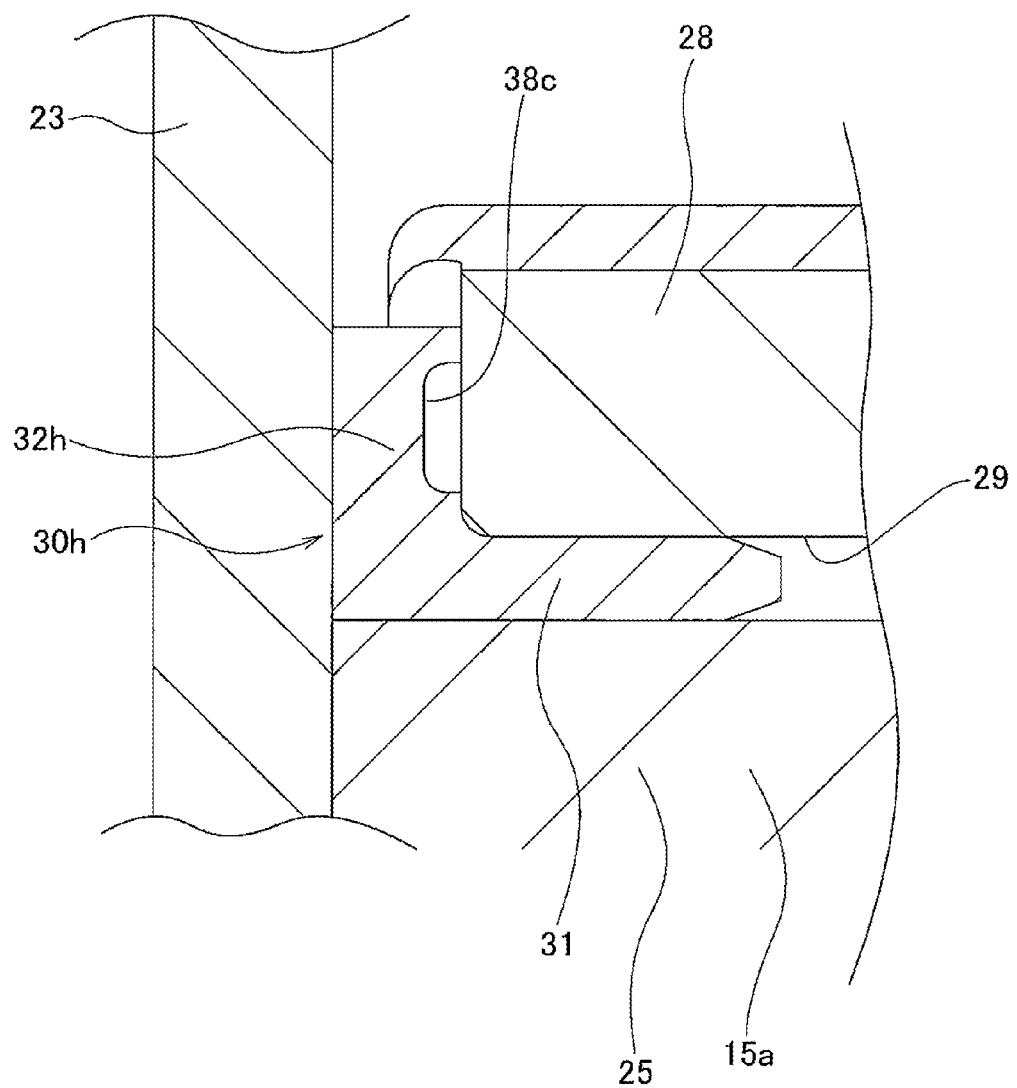
FIG. 10 is a drawing similar to FIG. 7, and illustrates a sixth example of an embodiment of the present invention.

FIG. 10 illustrates a sixth example of an embodiment of the present invention. In this example, ring-shaped continuous concave grooves 38 are formed around the entire circumference of the middle section in the radial direction of the inside surfaces (side surfaces of the pivot bracket 28 side) of the side plate sections 32h of a pair of bushings 30h so as to be concentric with the side plate sections 32h. In the neutral state in which there is no assist reaction force, only the portions of the inside surfaces of the side plate sections 32h that are separated from the concave grooves 38c come in contact with both side surfaces of the pivot bracket 28.

In the case of the steering column support apparatus of this example as well, support capability of the side plate sections 32h of the bushings 30h to support the assist resistance force is maintained, so even when sufficiently maintaining the height in the radial direction of the side plate sections 32h, it is possible in the neutral state to reduce the contact surface area between the inside surfaces of the side plate sections 32h and both side surfaces of the pivot bracket 28 by the amount of the area of the openings of the concave grooves 38c. Therefore, it is possible to stably keep the friction force that acts at the contact areas between the inside surfaces of the side plate sections 32h and both side surfaces of the pivot bracket 28, which becomes resistance when adjusting the height position of the steering wheel 1 (see FIG. 25), low. The other construction and functions are the same as in the fifth example.

Seventh Example

Figure 11:
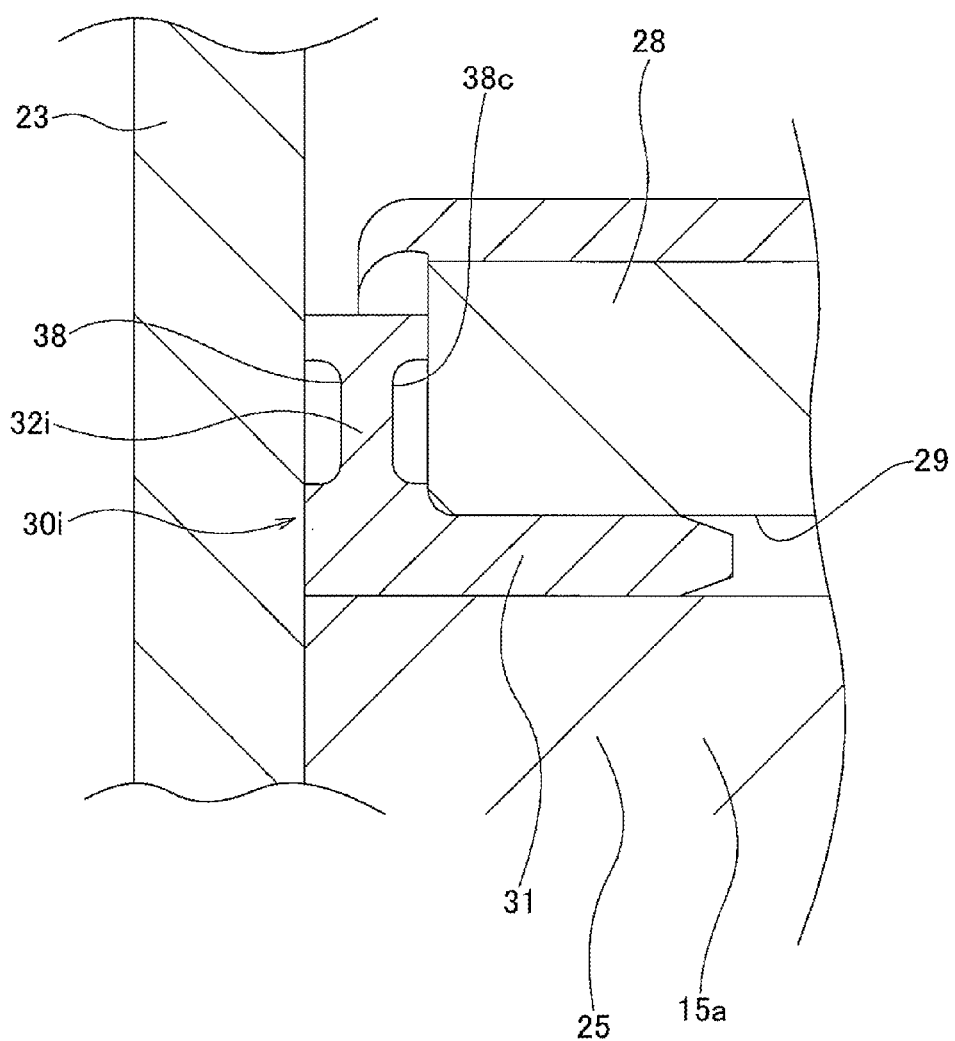
FIG. 11 is a drawing similar to FIG. 7, and illustrates a seventh example of an embodiment of the present invention.
Figure 12:
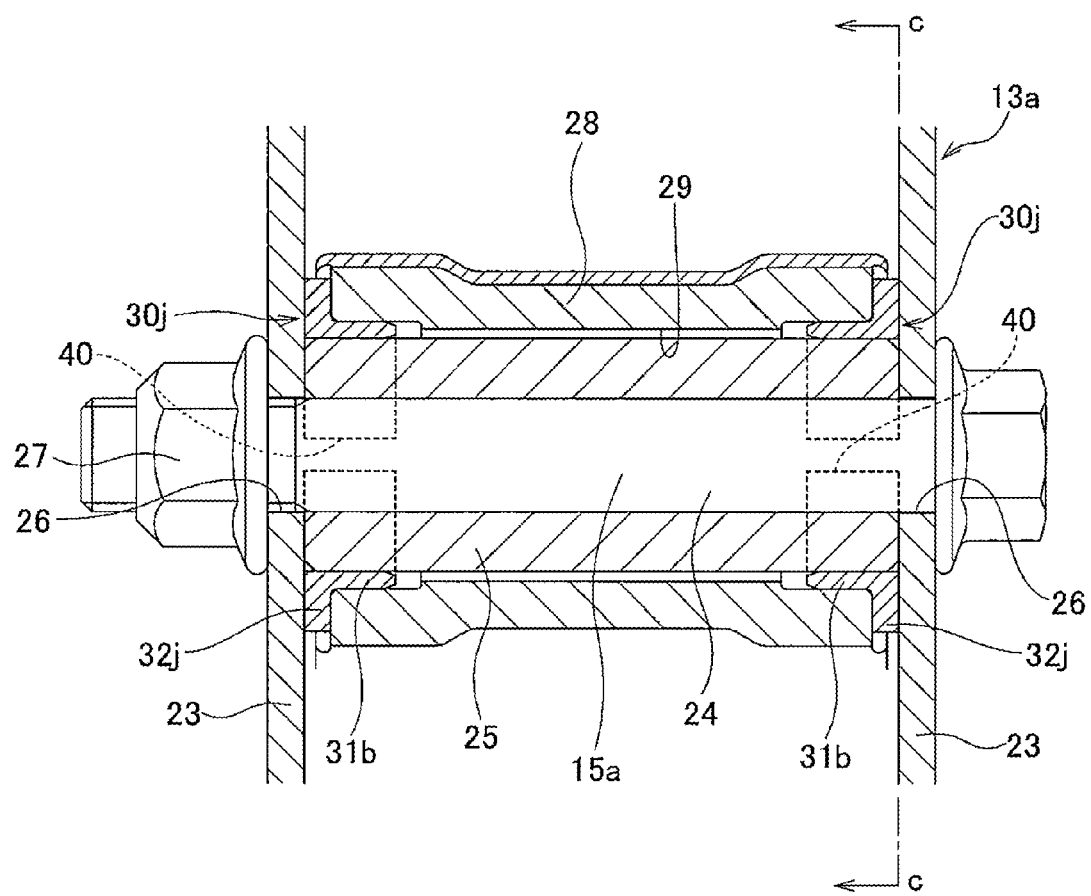
FIG. 12 is a drawing similar to FIG. 1, and illustrates an eighth example of an embodiment of the present invention.
Figure 13:
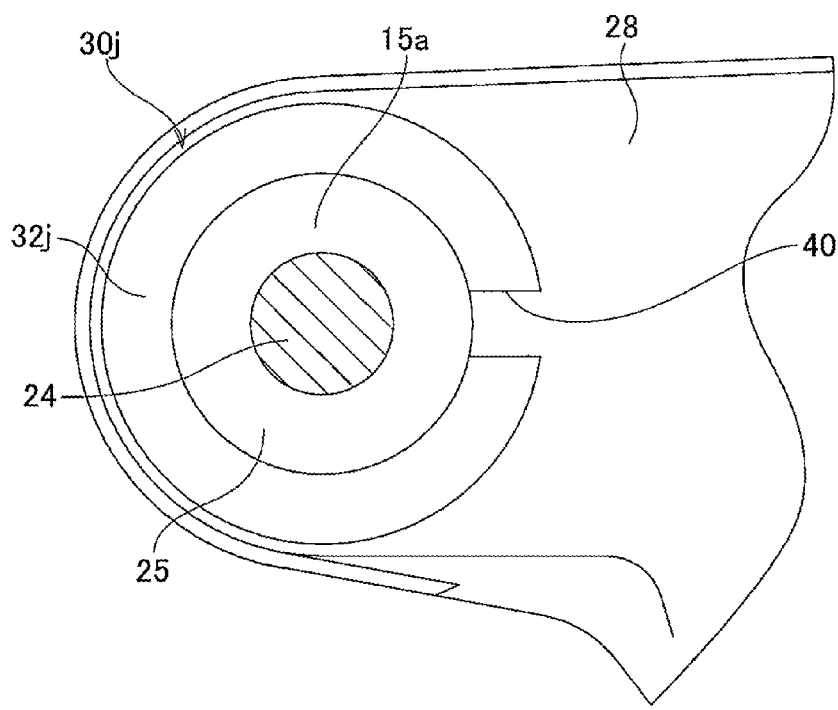
FIG. 13 is a cross-sectional drawing of section c-c in FIG. 12.
Figure 14:
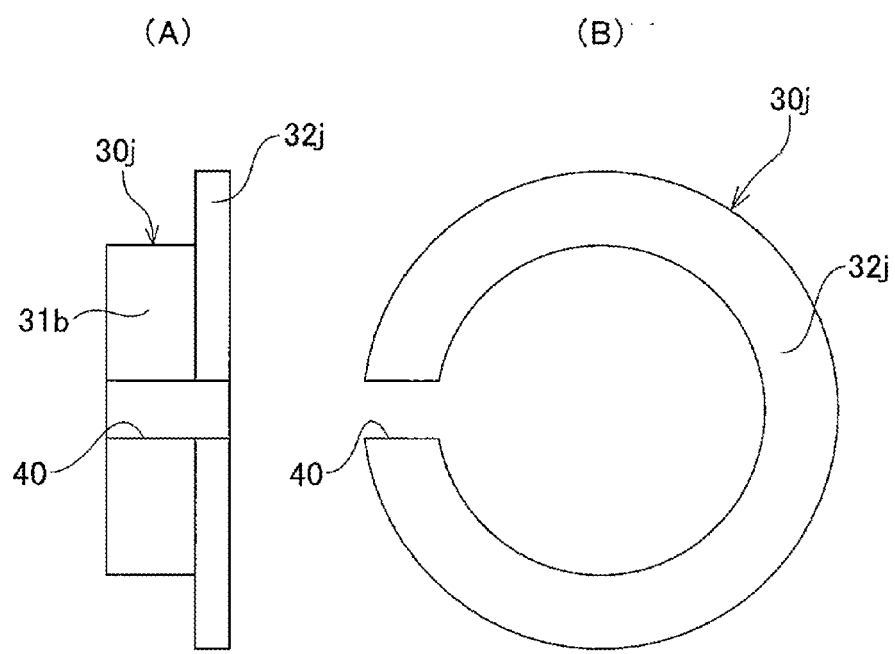
FIG. 14A is a side view of a bushing that is assembled in an eighth example of an embodiment of the present invention.
FIG. 14B is a view as seen from the right in FIG. 14A.

FIG. 11 illustrates a seventh example of an embodiment of the present invention. In this example, concave grooves 38, 38c are formed on both side surfaces of the side plate sections 32i of a pair of bushings 30i. Therefore, it is possible to more stably keep the resistance when adjusting the up-down position of the steering wheel 1 (see FIG. 25) low. The other construction and functions are the same as in the fifth and sixth examples.

Eight Example

FIG. 12 to FIG. 14B illustrate an eighth example of an embodiment of the present invention. In this example, bushings 30j have a non-continuous section 40, which corresponds to a thinned section of the present invention, in one location in the circumferential direction. This non-continuous section 40 passes through cylindrical section 31b in the thickness direction (radial direction of a bushing 30j), and also passes through the side plate section 32j in the thickness direction (axial direction of the bushing 30j). Therefore, the bushing 30j has an incomplete circular ring shape that is non-continuous in the circumferential direction in the non-continuous section 40. The width dimension in the circumferential direction of this non-continuous section 40 is fixed in the axial direction of cylindrical sections 31b in the portion that corresponds to the cylindrical sections 31b, and is fixed in the radial direction of side plate sections 32j in the portion that corresponds to the side plate sections 32j, respectively.

In this example, the support capability of the bushings 30j to support the assist reaction force is maintained, so even when the length in the axial direction of the cylindrical sections 31b and the height in the radial direction of the side plate sections 32j are sufficiently maintained, it is possible to reduce the surface area of each contact area, where there is a possibility of occurrence of sliding in the circumferential direction, by the amount of the area of the openings of the non-continuous sections 40 in the contact areas. Therefore, even when sliding occurs in the circumferential direction in one of the contact areas, it is possible to stably keep the friction force that acts at these contact areas, which becomes resistance when adjusting the height position of the steering wheel 1 (see FIG. 25), low. Consequently, it is possible to improve the workability when adjusting the height position of the steering wheel 1.

Even when the radially outside of the side plate sections 32c receive strong compression due to deformation of the support plate sections 23, the thinned sections that are provided on the side plate sections 32c make it possible for the radially outside end sections of the side plate sections 32c to suitably follow the deformation of the support plate sections 23, and thus abnormal wear of the side plate sections 32c is prevented. Therefore, it is possible to suppress strain of the side plate sections 32c due to repeated loading of the assist reaction force, to sufficiently maintain durability of the side plate sections 32c, and to prevent the occurrence of loose movement of the tilt pivot portion over a long period of time.

In this example as well, it is possible to reduce friction force that acts at the contact areas between the surfaces of the bushings 30j and the opposing surfaces by applying grease to the surfaces of the bushings 30j. In this case, the inside of the non-continuous sections 40 as a thinned section of the present invention can be used to hold grease. The other construction and functions are the same as in the first and fifth examples of an embodiment of the present invention, and as in the first example of conventional construction. Moreover, the construction of this example can be additionally applied to the first through seventh examples of an embodiment of the present invention.

Ninth Example

Figure 15:
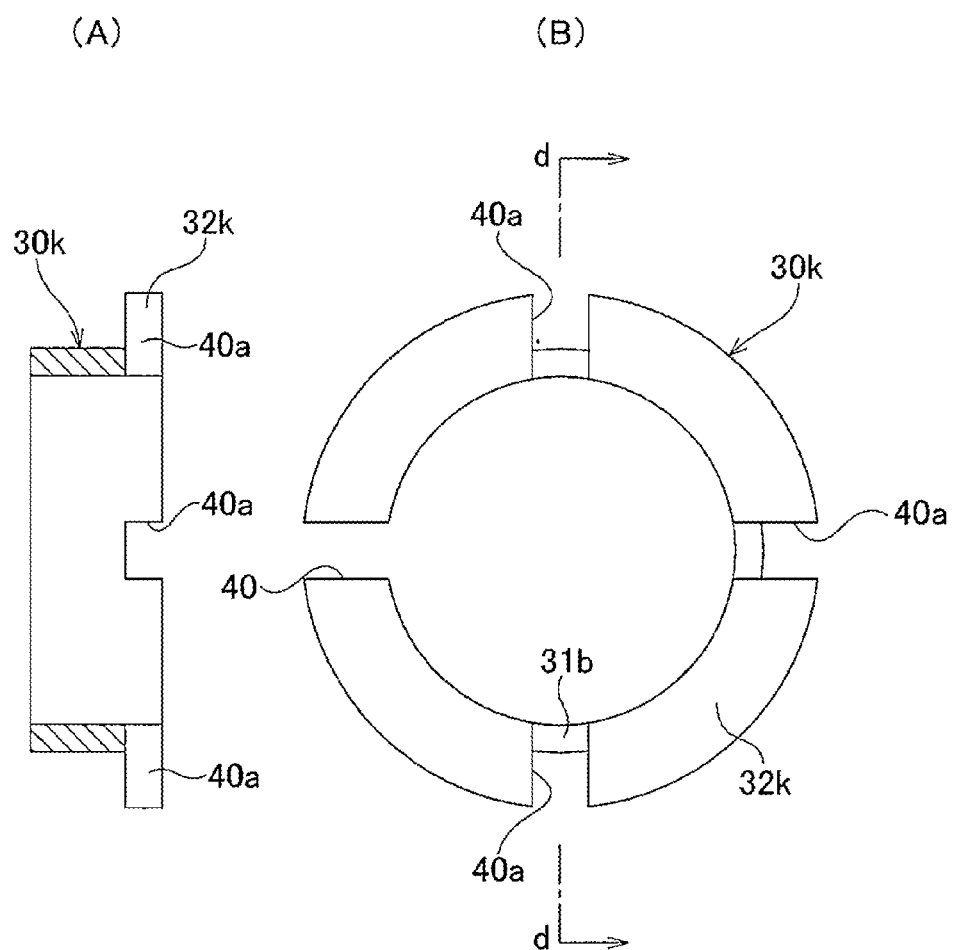
FIG. 15A is a cross-sectional view of a bushing that is assembled in a ninth example of an embodiment of the present invention (section d-d in FIG. 15B)
FIG. 15B is a view as seen from the right in FIG. 15A.

FIGS. 15A and 15B illustrate a ninth example of an embodiment of the present invention. In this example, the bushings 30k have a non-continuous section 40 in one location on the circumferential direction as in the case of the eighth example of the embodiment. Furthermore, in the case of the bushings 30k of this example, of the four locations that are uniformly spaced in the circumferential direction and that include the location where the non-continuous section 40 is located, non-continuous sections 40a, which corresponds to a thinned section of the present invention respectively, are formed at three locations other than the location where the non-continuous section 40 is located. However, these non-continuous sections 40a are non-continuous only in the side plate sections 32k, and are continuous in the cylindrical sections 31b.

In the case of this example that uses bushings 30k such as these, when compared with the eighth example, it is possible to further reduce the contact surface area between both side surfaces of the side plate sections 32k and the opposing surfaces by the amount of the area of the openings of these non-continuous sections 40a in both of the side surfaces. Therefore, it is possible to more stably keep the resistance low when adjusting the height position of the steering wheel 1 (see FIG. 25). The other construction and functions are the same as in the case of the eighth example.

Tenth Example and Eleventh Example

Figure 16:
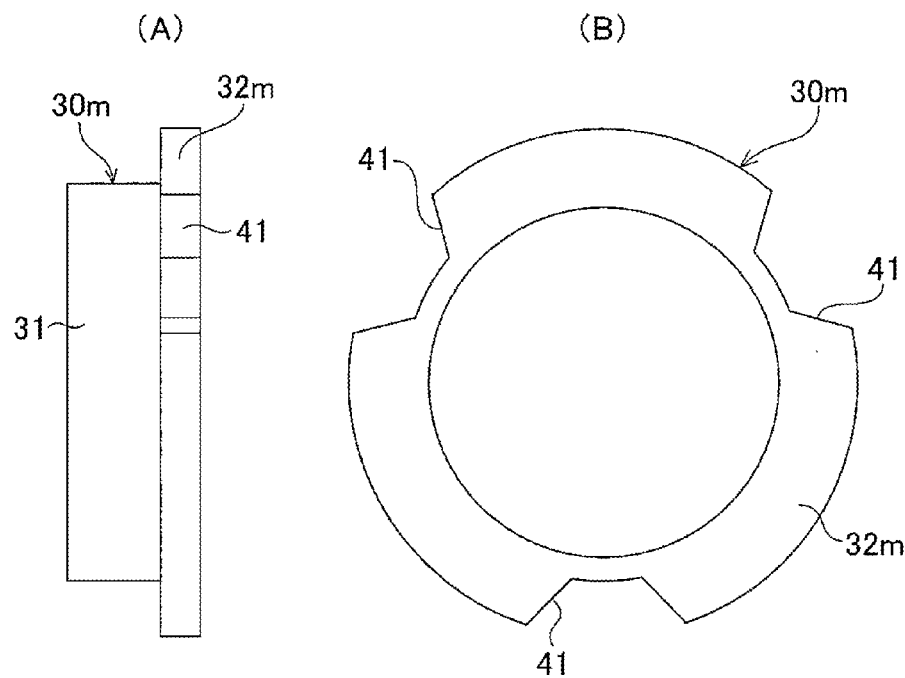
FIGS. 16A and 16B are drawings similar to FIGS. 14A and 14B, and illustrate a bushing that is assembled in a tenth example of an embodiment of the present invention.
Figure 17:
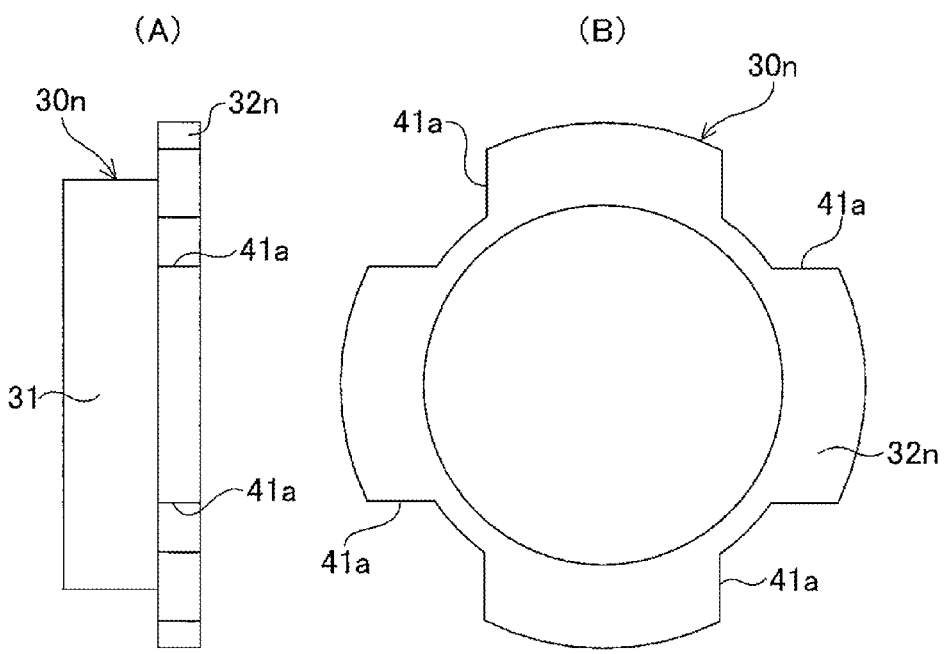
FIGS. 17A and 17B are drawings similar to FIGS. 14A and 14B, and illustrate a bushing that is assembled in an eleventh example of an embodiment of the present invention.

FIGS. 16A and 16B illustrate a tenth example of an embodiment of the present invention, and FIGS. 17A and 17B illustrate an eleventh example of an embodiment of the present invention. In the bushings 30m, 30n that are assembled in the tenth and eleventh examples of the embodiment, notches 41, 41a, which correspond to a thinned section of the present invention respectively, are open on the outer circumferential edges of the side plate sections 32m, 33n and are provided at a plurality of locations (three locations in FIGS. 16A, 16B and four locations in FIGS. 17A, 17B) that are uniformly spaced in the circumferential direction of the side plate sections 32m, 32n.

In the case of the tenth and eleventh examples of the embodiment of the present invention as well, it is possible to reduce the contact surface area between both side surfaces of the side plate sections 32m, 32n and the opposing surfaces that face both of these side surfaces by the amount of the area of the openings of the notches 41, 41a in both of these side surfaces. The other construction and functions are the same as in the eighth example.

Twelfth Example and Thirteenth Example

Figure 18:
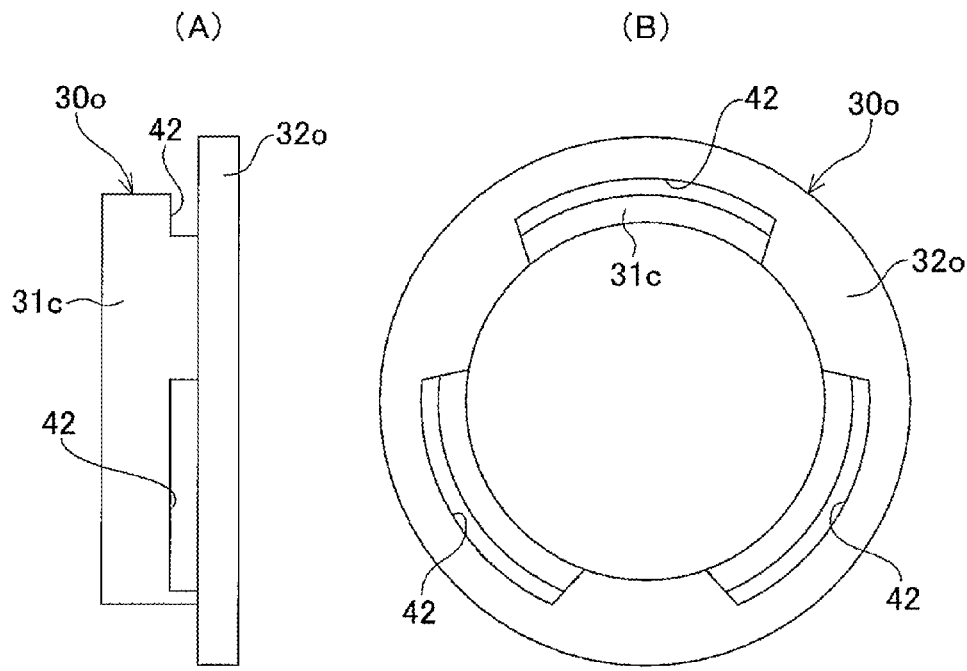
FIGS. 18A and 18B are drawings similar to FIGS. 14A and 14B, and illustrate a bushing that is assembled in a twelfth example of an embodiment of the present invention.
Figure 19:
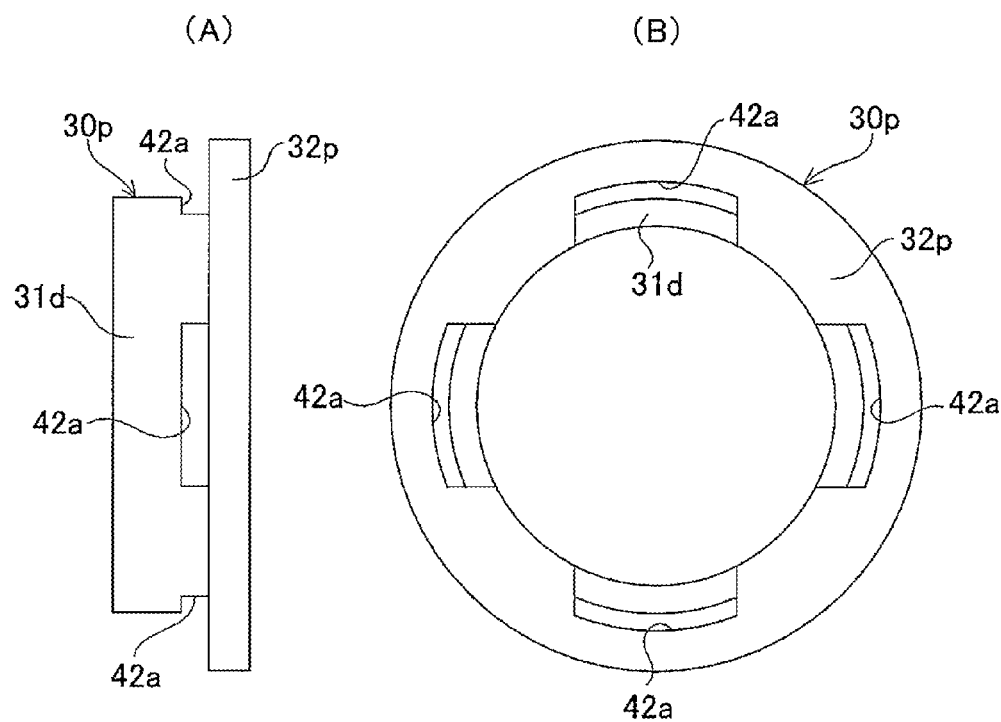
FIGS. 19A and 19B are drawings similar to FIGS. 14A and 14B, and illustrate a bushing that is assembled in a thirteenth example of an embodiment of the present invention.

FIGS. 18A and 18B illustrate a twelfth example of an embodiment of the present invention, and FIGS. 19A and 19B illustrate a thirteenth example of an embodiment of the present invention. In the bushings 30o, 30p of the twelfth and thirteenth examples, through holes 42, 42a, which correspond to a thinned section of the present invention respectively, are formed in a plurality of locations (three locations in FIGS. 18A, 18B, and four locations in FIGS. 19A, 19B) that are uniformly spaced in the circumferential direction of the continuous sections between the cylindrical sections 31c, 31d and the side plate sections 32o, 32p. The through holes 42 pass through the cylindrical sections 31c in the thickness direction (radial direction) as well as the side plate sections 32o in the thickness direction (axial direction). The through holes 42a pass through the cylindrical sections 31d in the thickness direction as well as the side plate sections 32p in the thickness direction.

In the case of the twelfth and thirteenth examples as well, it is possible to reduce the contact surface area between both side surfaces of the side plate sections 32o, 32p and their opposing surfaces, and between both the inner and outer circumferential surfaces of the cylindrical sections 31c, 31d and their opposing surfaces by the amount of the area of the openings of the through holes 42, 42a. The other construction and functions are the same as in the eighth example.

Fourteenth Example and Fifteenth Example

Figure 20:
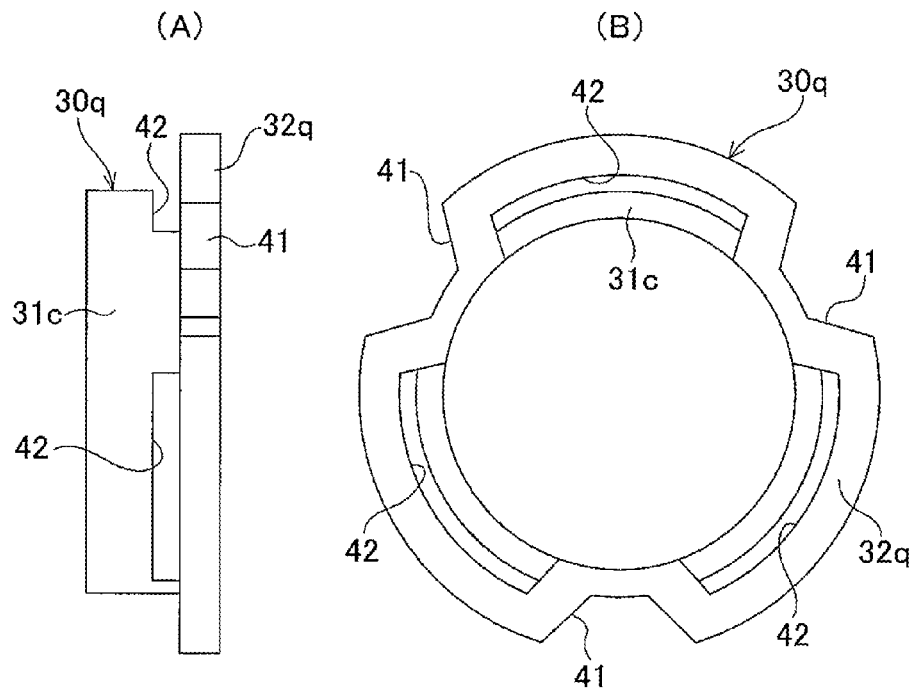
FIGS. 20A and 20B are drawings similar to FIGS. 14A and 14B, and illustrate a bushing that is assembled in a fourteenth example of an embodiment of the present invention.
Figure 21:
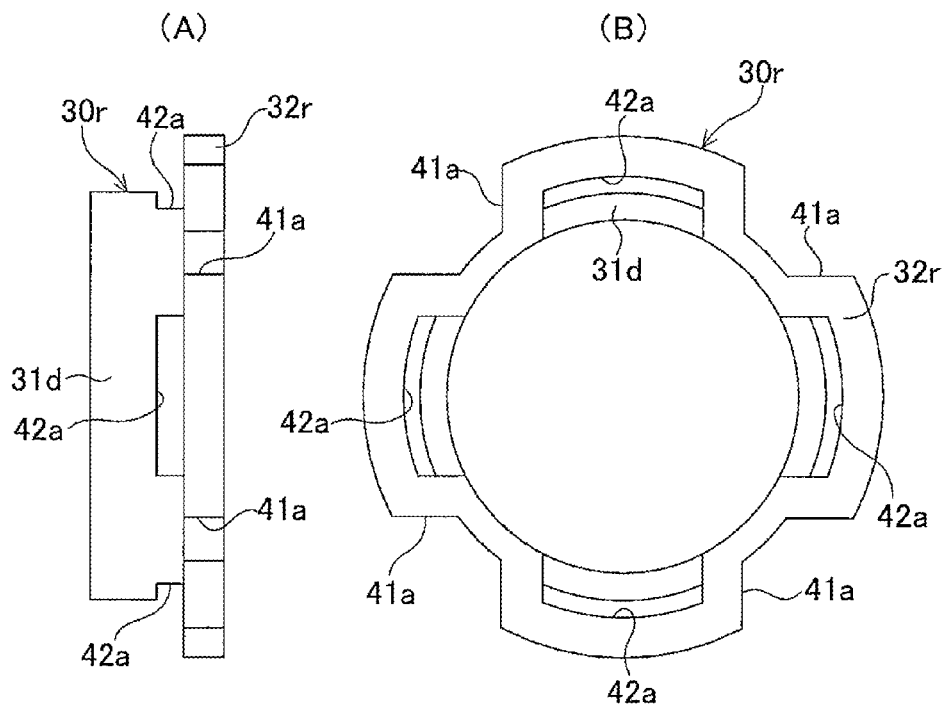
FIGS. 21A and 21B are drawings similar to FIGS. 14A and 14B, and illustrate a bushing that is assembled in a fifteenth example of an embodiment of the present invention.

FIGS. 20A and 20B illustrate a fourteenth example of an embodiment of the present invention, and FIGS. 21A and 21B illustrate a fifteenth example of an embodiment of the present invention. In the bushings 30q, 30r of the fourteenth and fifteenth examples, a plurality of notches 41 or 41a that are similar to those in the tenth or eleventh example, and a plurality of through holes 42 or 42a that are similar to those in the twelfth or thirteenth example are formed so as to alternate and be uniformly spaced in the circumferential direction.

Figure 25:
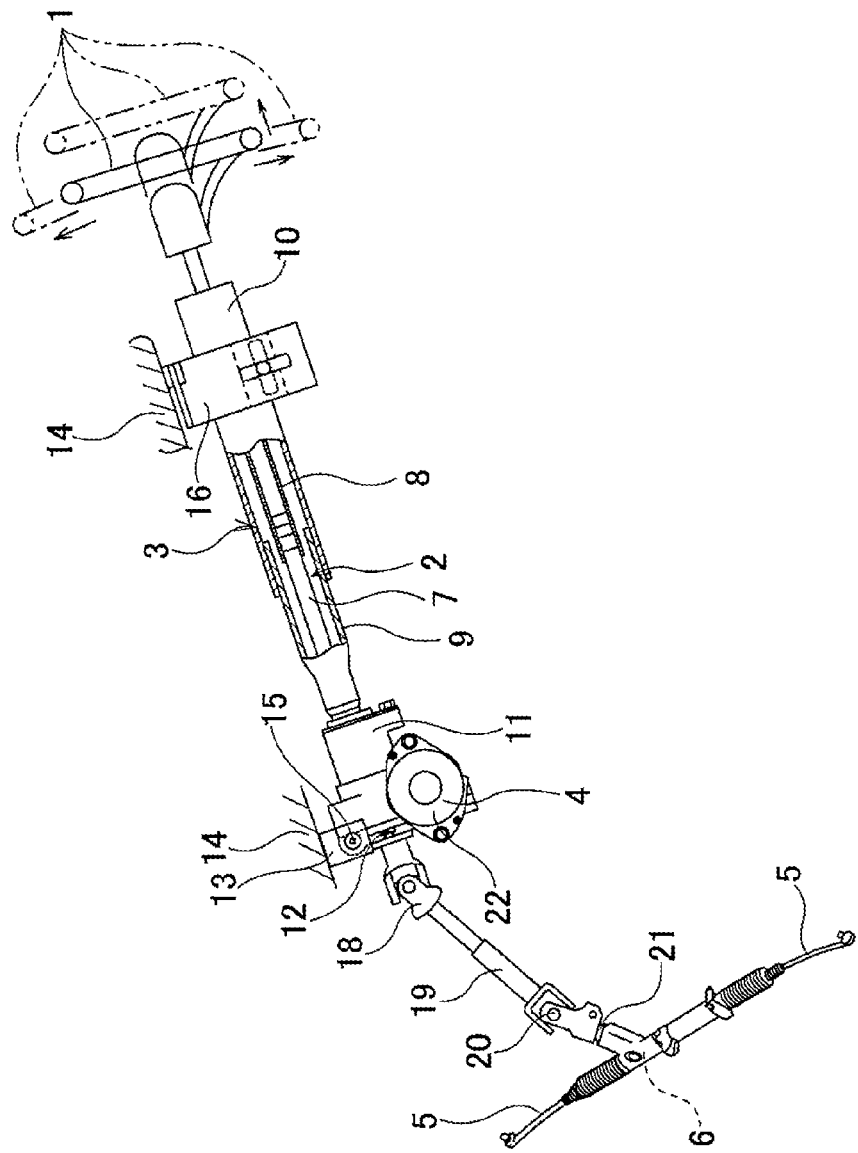
FIG. 25 is a simplified side view of an example of conventional construction of an electric power steering apparatus having a tilt mechanism, and illustrates part as a cross section.
Figure 26:
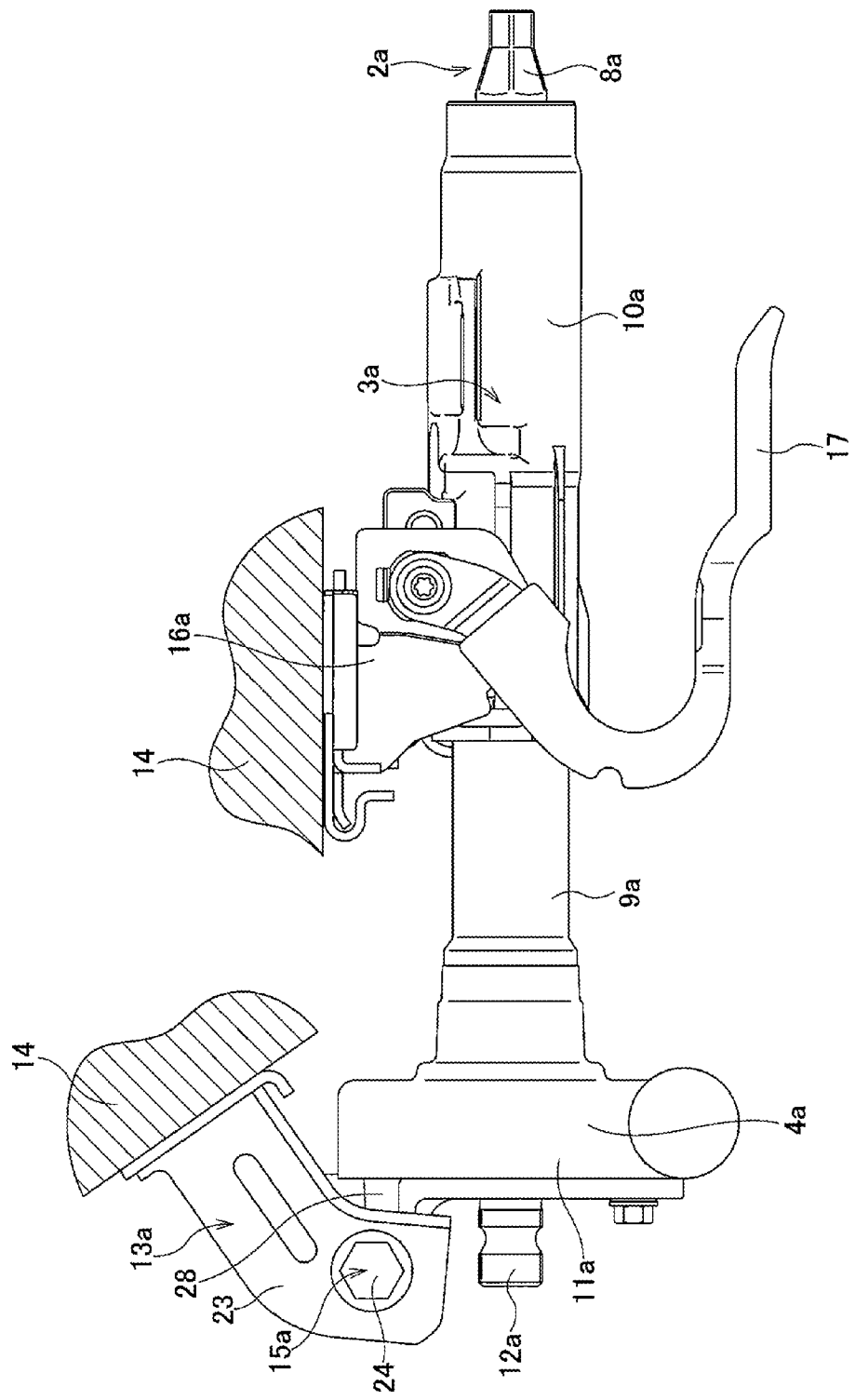
FIG. 26 is a side view illustrating a main part of a first example of conventional construction of a steering column support apparatus.
Figure 27:
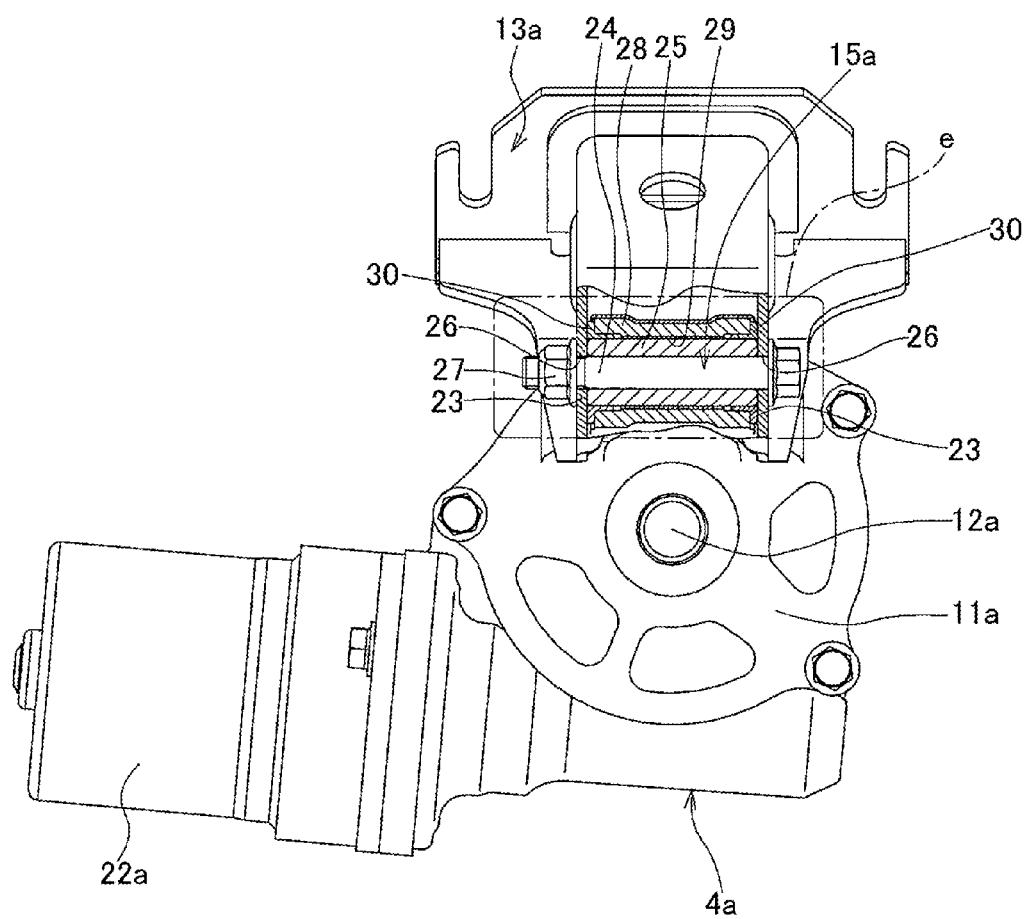
FIG. 27 is a drawing illustrating a cross section of the tilt pivot portion as seen from the left in FIG. 26.
Figure 28:
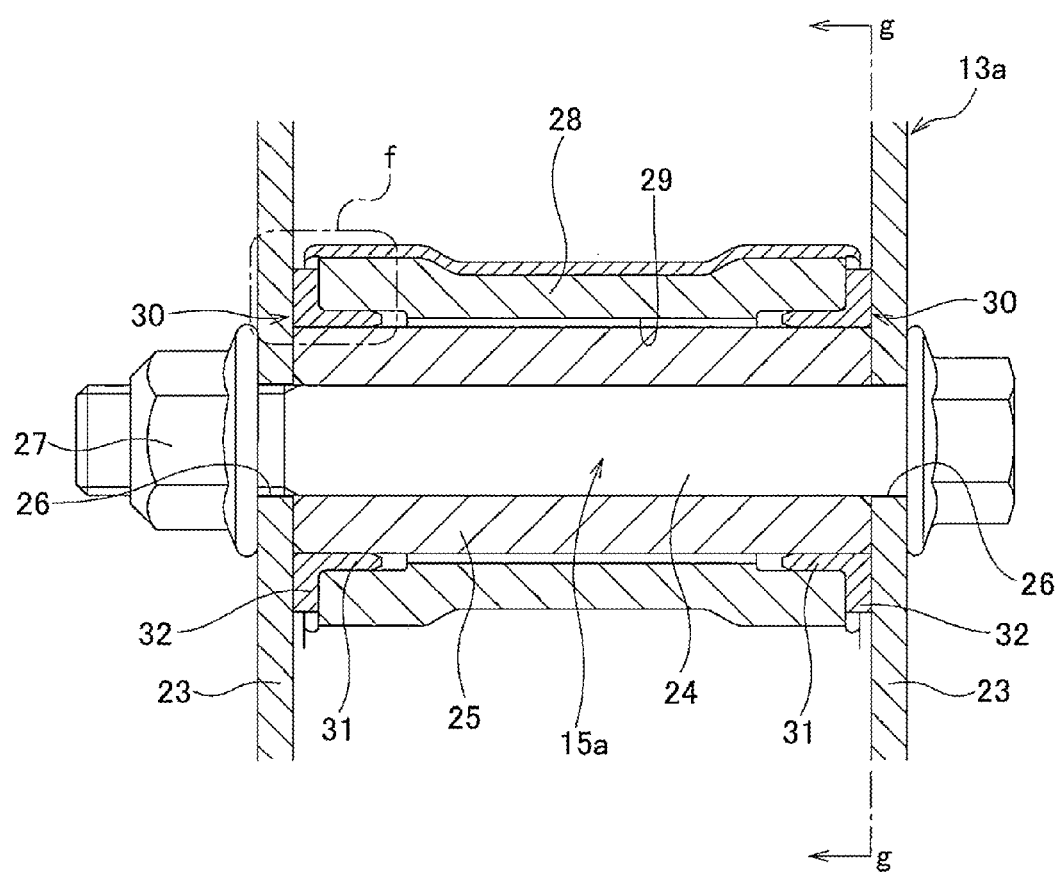
FIG. 28 is an enlarged view of part e in FIG. 27.
Figure 29:
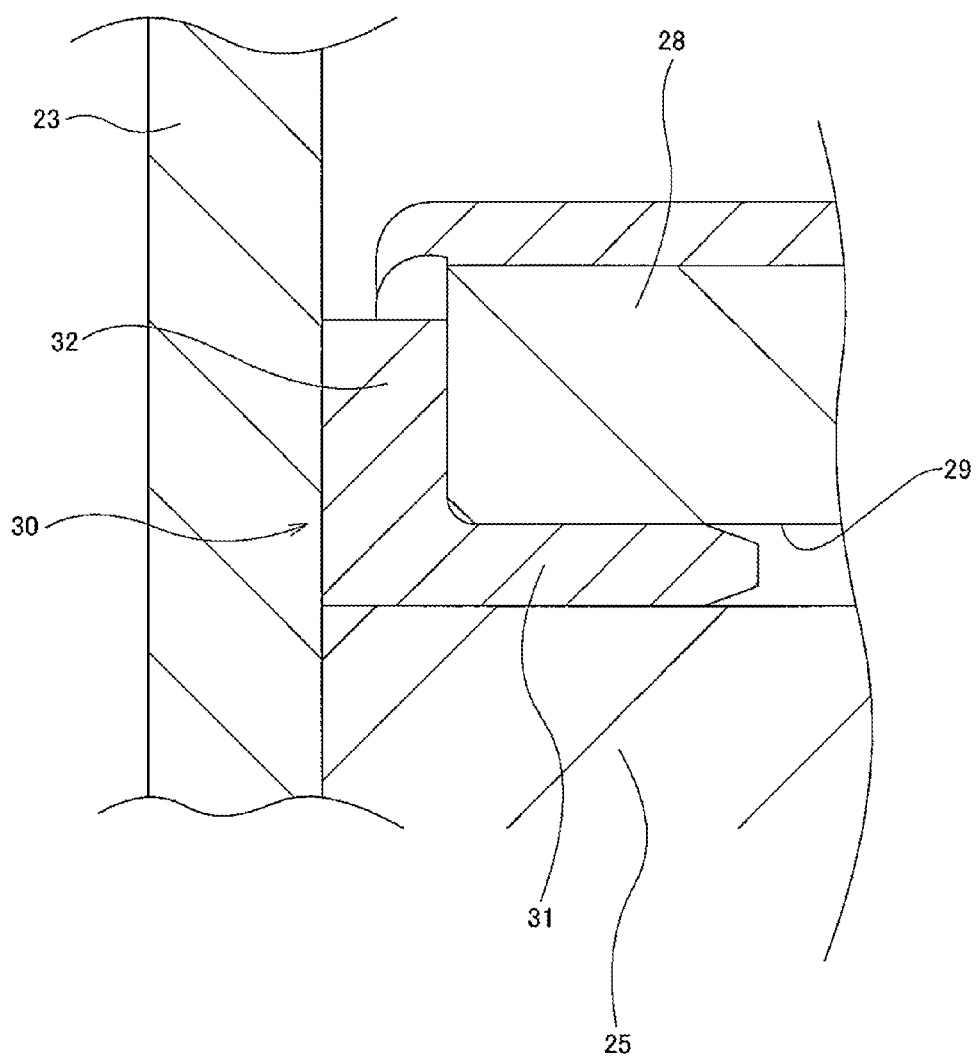
FIG. 29 is an enlarged view of part f in FIG. 28.
Figure 30:
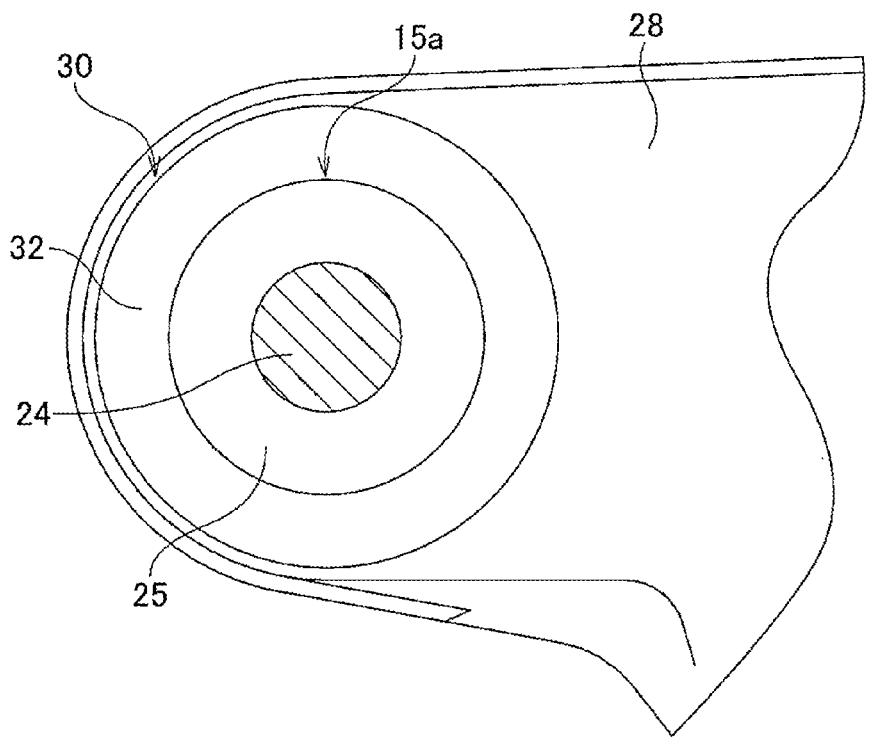
FIG. 30 is a cross-sectional drawing of section g-g in FIG. 28.
Figure 31:
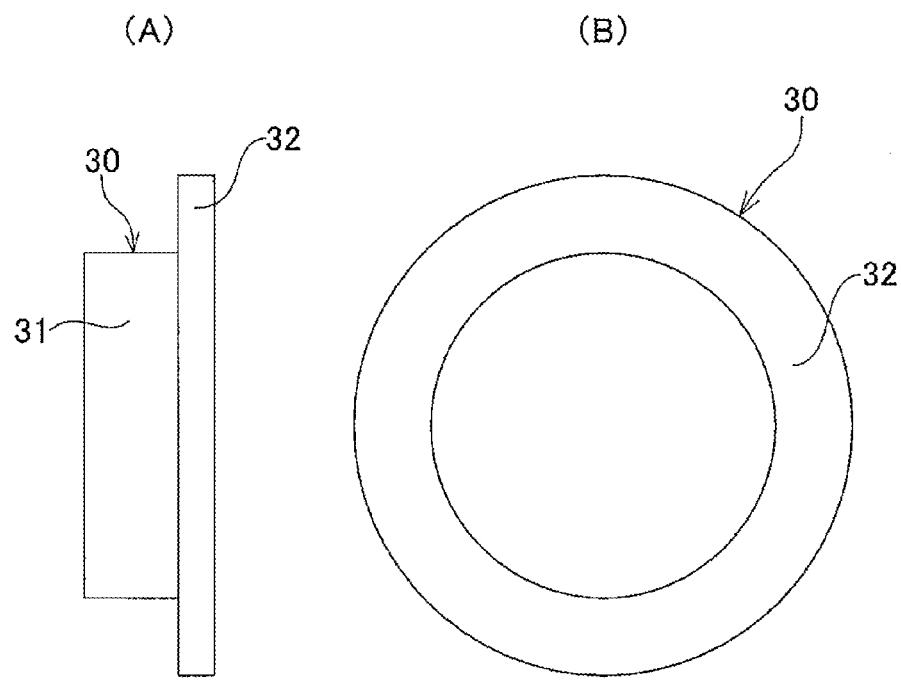
FIGS. 31A and 31B are drawings similar to FIGS. 14A and 14B, and illustrate a bushing that is assembled in a first example of conventional construction.
Figure 32:
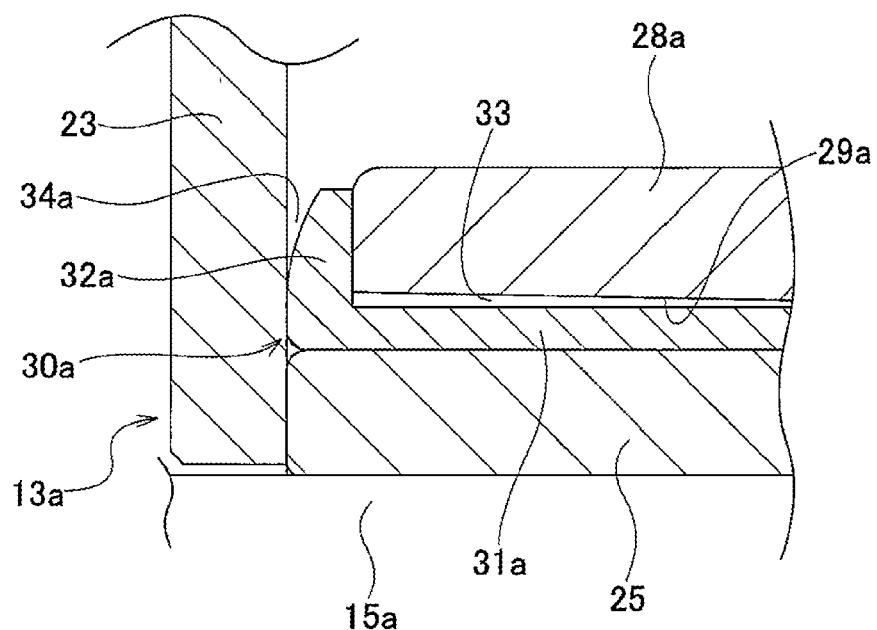
FIG. 32A is a drawing similar to FIG. 29, and illustrates a bushing that is assembled in a second example of conventional construction of a steering column support apparatus.
FIG. 32B is a drawing similar to FIG. 29, and illustrates a bushing that is assembled in a third example of conventional construction of a steering column support apparatus.
Figure 32:
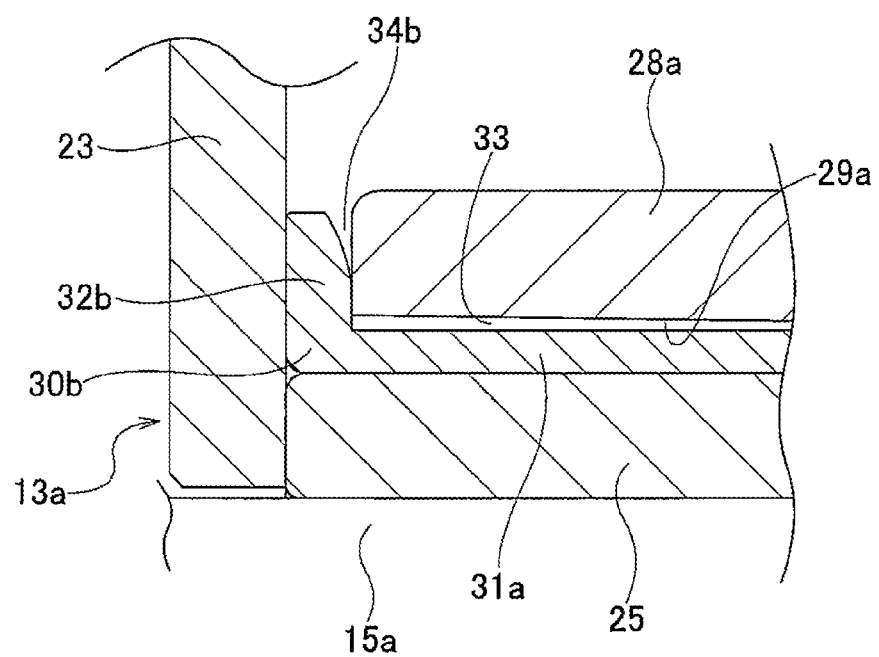

With the fourteenth and fifteenth examples of, when compared with the tenth through the thirteenth examples, it is possible to more stably keep the resistance low when adjusting the height position of the steering wheel 1 (see FIG. 25). The other construction and functions are the same as in the tenth or eleventh example, and in the twelfth or thirteenth example.

Sixteenth Example and Seventeenth Example

Figure 22:
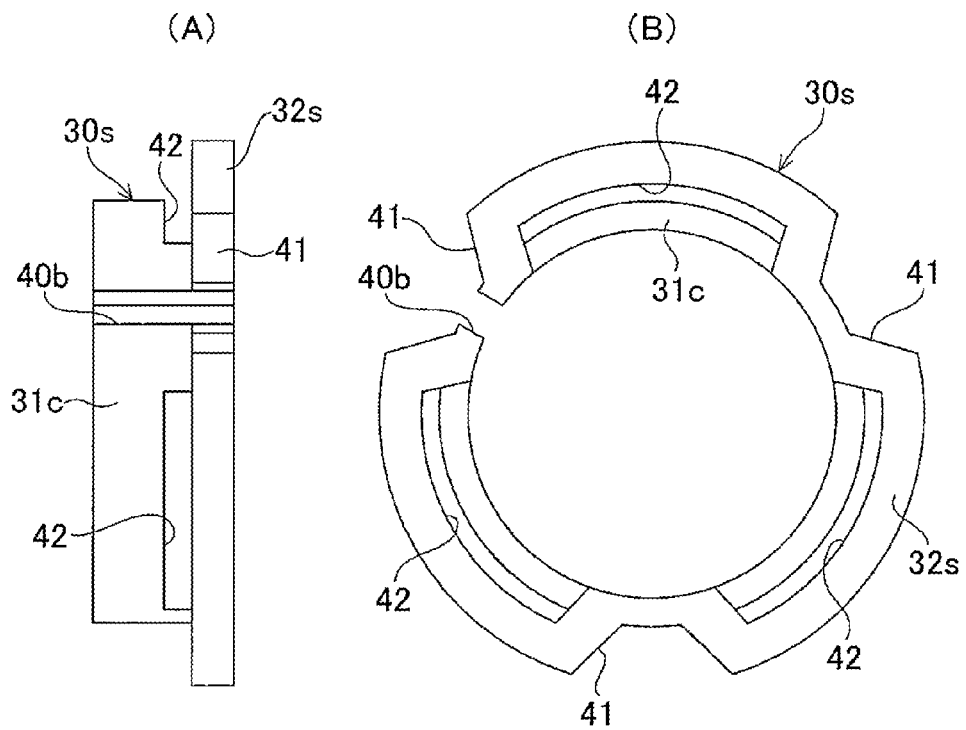
FIGS. 22A and 22B are drawings similar to FIGS. 14A and 14B, and illustrate a bushing that is assembled in a sixteenth example of an embodiment of the present invention.
Figure 23:
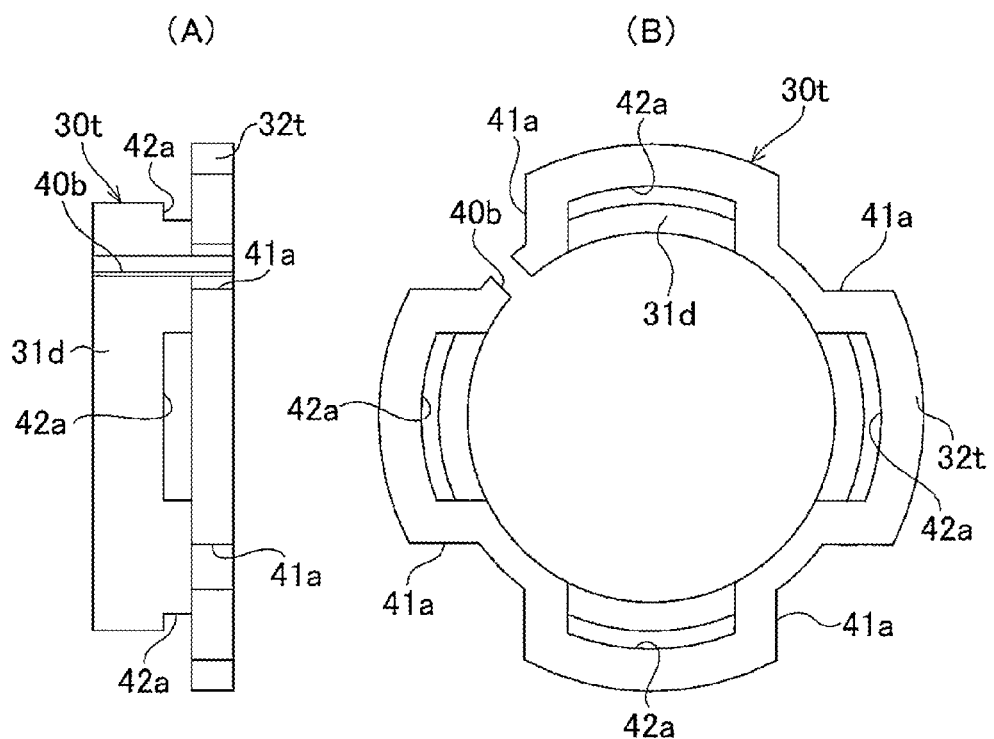
FIGS. 23A and 23B are drawings similar to FIGS. 14A and 14B, and illustrate a bushing that is assembled in a seventeenth example of an embodiment of the present invention.

FIGS. 22A and 22B illustrate a sixteenth example of an embodiment of the present invention, and FIGS. 23A and 23B illustrate a seventeenth example of an embodiment of the present invention. In the bushings 30s and 30t of the sixteenth and seventeenth examples, a non-continuous section 40b is formed at one location in the circumferential direction of the bushings 30q in the fourteenth example or the bushings 30r in the fifteenth example, in a portion separated from the through holes 42, 42a.

In the case of the sixteenth and seventeenth examples, when compared with the fourteenth and fifteenth examples, it is possible to reduce the contact surface area between the surfaces of the bushings 30s, 30t and the opposing surfaces by the amount of the area where the non-continuous section 40b is formed. Therefore, it is possible to more stably keep the resistance low when adjusting the height position of the steering wheel 1 (see FIG. 25). The other construction and functions are the same as in the fourteenth and fifteenth examples.

Figure 24:
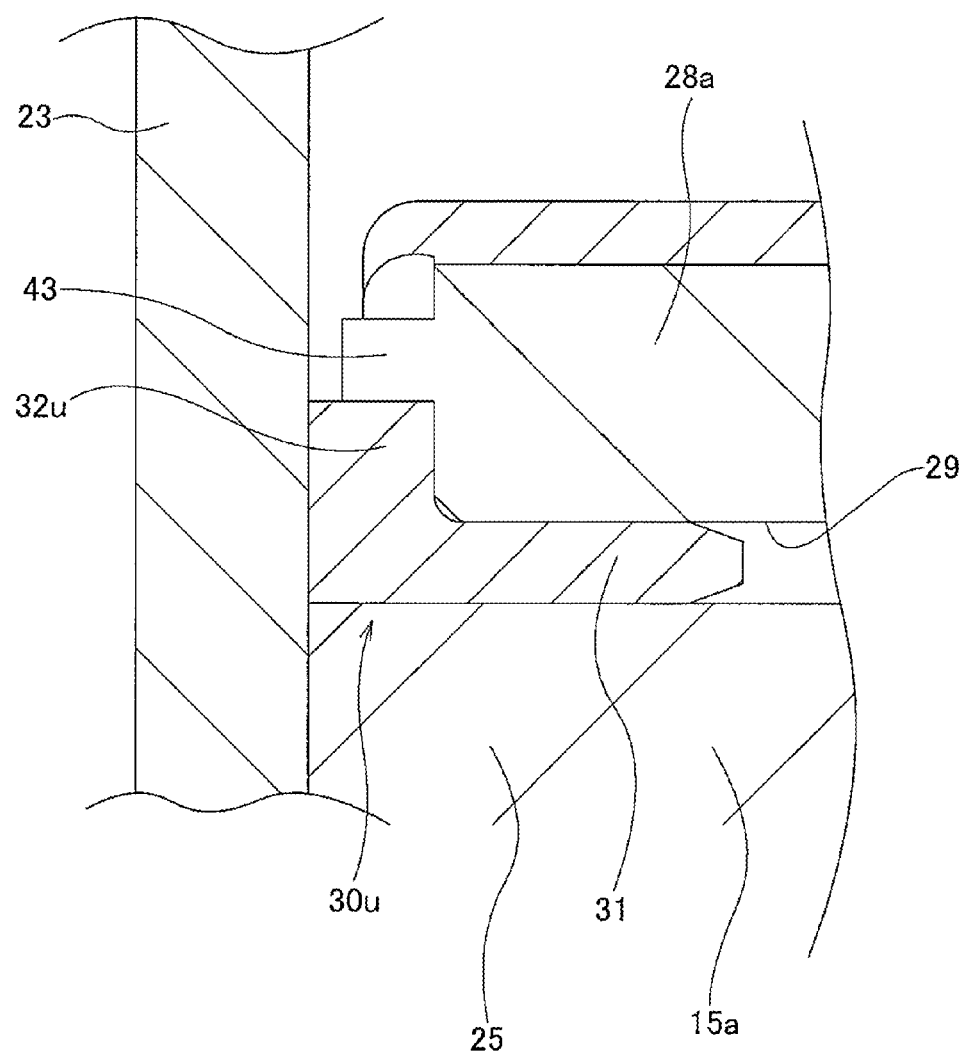
FIG. 24 is a drawing similar to FIG. 2 and illustrates a reference example of construction, wherein the force required for adjusting the height position of the steering wheel can be reduced, and the amount that the pivot bracket inclines with respect to the center axis of the tilt pivot shaft due to the assist reaction force is suppressed.

FIG. 24 illustrates construction that is outside the technical scope of the present invention, however, similar to the present invention, the construction makes it possible to stably keep the friction force that acts between the surfaces of the bushings and the opposing surfaces that face these surfaces low when adjusting the height position of the steering wheel 1 (see FIG. 25), while at the same time maintaining the support capability of a pair of bushings to support the assist reaction force. In the case of this construction, while the height in the radial direction of the side plate sections 32u of the bushings 30u is reduced, protrusions 43 that are formed in the middle sections in the radial direction of the side surfaces of the pivot bracket 28a are located on the radially outside of the side plate sections 32u, and in the neutral state, the tip end surfaces of the protrusions 43 are closely faced the inside surfaces of the support plate sections 23. In the case of the construction illustrated in FIG. 24, it is possible to reduce the contact surface area between both side surfaces of the side plate sections 32u and the opposing surfaces by the amount that the height in the radial direction of the side plate sections 32u are reduced, and thus it is possible to keep the friction force that acts on the contact areas between both of these side surfaces and the opposing surfaces low. Therefore, it is possible to keep the resistance when adjusting the height position of the steering wheel 1 low by that amount. Moreover, when there is a tendency for the pivot bracket 28a to displace in the axial direction as well as incline due to the assist reaction force, by the tip end surface of a protrusion 43 coming in contact with the inside surface of a support plate section 23, it is possible to prevent this kind of displacement and inclination from becoming larger than this. Up until the tip end surface of the protrusion 43 comes in contact with the inside surface of a support plate section 23, a buffering action due to elastic deformation of the bushing 30u is obtained.

EXPLANATION OF REFERENCE NUMBERS

1 Steering wheel
2, 2a Steering shaft
3, 3a Steering column
4, 4a Electric assist apparatus
5 Tie rod
6 Steering gear unit
7 Inner shaft
8, 8a Outer shaft
9, 9a Inner column
10, 10a Outer column
11, 11a Housing
12, 12a Output shaft
13, 13a Front support bracket
14 Vehicle body
15, 15a Tilt pivot shaft
16, 16a Rear support bracket
17 Adjustment handle
18 Universal joint
19 Intermediate shaft
20 Universal joint
21 Input shaft
22, 22a Electric motor
23 Support plate section
24 Tilt bolt
25 Sleeve
26 Circular hole
27 Nut
28, 28a Pivot bracket
29 Through hole
30, 30a to 30k, 30m to 30u Bushing
31, 31a to 31d Cylindrical section
32, 32a to 32k, 32m to 32u Side plate section
33 Gap
34a, 34b Gap
35, 35a Stepped section
36, 36a Main contact surface section
37, 37a to 37c Sub contact surface section
38, 38a to 38c Concave groove
39 Concave section
40, 40a, 40b Non-continuous section
41, 41a Notch
42, 42a Through hole
43 Protrusion

What is claimed is:

1. A steering column support apparatus, comprising:
a front support bracket that is fastened to a vehicle body and that has a pair of support plate sections that are parallel with each other and separated in a width direction of the vehicle body;
a tilt pivot shaft that is arranged in the width direction of the vehicle body so as to be spanned between side plate sections;
a pivot bracket that is provided on part of a housing of an electric assist apparatus, and that has a through hole through which the tilt pivot shaft is inserted and supports a steering column, which supports a steering shaft so as to be able to freely rotate, by way of the housing; and a pair of bushings, that are made of an elastic material or a low-friction material so as to be formed into an annular shape as a whole, and that are fitted around both end sections in an axial direction of the tilt pivot shaft, each of the pair of bushings having a cylindrical section that is held between an outer circumferential surface of the tilt pivot shaft and an inner circumferential surface of the through hole; a circular ring-shaped side plate section that extends outward in a radial direction from one end section in the axial direction of the cylindrical section, and is held between a side surface of the pivot bracket and an inside surface of the support plate section; and a thinned section that is provided on part of at least one of both circumferential surfaces of the cylindrical section, or part of at least one of both side surfaces of the side plate section, so as not to come in contact with opposing surfaces that face the circumferential surfaces or the side surfaces in a neutral state where at least an assist force that is applied to the steering shaft from the electric assist apparatus is not generated.

2. The steering column support apparatus according to claim 1, wherein the thinned section is composed of a concave section that is provided on the at least one of both side surfaces of the side plate section.

3. The steering column support apparatus according to claim 2, wherein a main contact surface section, which comes in contact with the opposing surface in at least the neutral state, is formed on one half in the radial direction of the at least one of both side surfaces of the side plate section, and a sub contact surface section, which does not come in contact with the opposing surface in at least the neutral state, and comes in contact with the opposing surface only when the side plate section elastically deforms due to the assist force, is formed on other half section in the radial direction; the sub contact surface section forming the concave section.

4. The steering column support apparatus according to claim 3, wherein the main contact surface section is provided on a radially inside, and the sub contact surface section is provided on a radially outside.

5. The steering column support apparatus according to claim 2, wherein the concave section is provided in the middle section in the radial direction of the at least one of both side surfaces of the side plate section.

6. The steering column support apparatus according to claim 5, wherein the concave section is composed of concave grooves that extend in the radial direction and that are provided at a plurality of locations in a circumferential direction of the at least one of both side surfaces of the side plate section.

7. The steering column support apparatus according to claim 5, wherein the concave section is a concave groove that extends in a circumferential direction of the at least one of both side surfaces of the side plate section.

8. The steering column support apparatus according to claim 7, wherein the concave grove is formed around the entire circumference of the at least one of both side surfaces of the side plate section.

9. The steering column support apparatus according to claim 1, wherein the thinned section is formed so as to pass through in a thickness direction in at least one location in a circumferential direction of at least one of the cylindrical section and side plate section.

10. The steering column support apparatus according to claim 9, wherein the thinned section is a non-continuous section in at least one location in the circumferential direction of the at least one of the cylindrical section and side plate section such that part in the circumferential direction thereof is non-continuous.

11. The steering column support apparatus according to claim 9, wherein the thinned section is a notch that is open in an end edge of the at least one of the cylindrical section and side plate section.

12. The steering column support apparatus according to claim 9, wherein the thinned section is a through hole that passes in a thickness direction through the at least one of the cylindrical section and side plate section.

13. The steering column support apparatus according to claim 1, wherein of the portions of the outer circumferential surface of the tilt pivot shaft and the inner circumferential surface of the through hole that hold the cylindrical section of the bushing are cylindrical surfaces whose diameter does not change along the axial direction.

* * * * *